US011245729B2

(12) United States Patent
Monni

(10) Patent No.: US 11,245,729 B2
(45) Date of Patent: Feb. 8, 2022

(54) GROUP OPTIMIZATION FOR NETWORK COMMUNICATIONS

(71) Applicant: salesforce.com, inc., San Francisco, CA (US)

(72) Inventor: Gianstefano Monni, Dublin (IE)

(73) Assignee: SALESFORCE.COM, INC., San Francisco, CA (US)

(*) Notice: Subject to any disclaimer, the term of this patent is extended or adjusted under 35 U.S.C. 154(b) by 282 days.

(21) Appl. No.: 16/506,724

(22) Filed: Jul. 9, 2019

(65) Prior Publication Data
US 2021/0014274 A1 Jan. 14, 2021

(51) Int. Cl.
H04L 29/06 (2006.01)
H04L 12/24 (2006.01)

(52) U.S. Cl.
CPC .......... H04L 63/20 (2013.01); H04L 41/0893 (2013.01); H04L 63/0263 (2013.01)

(58) Field of Classification Search
CPC .. H04L 63/20; H04L 41/0893; H04L 63/0263
See application file for complete search history.

(56) References Cited

U.S. PATENT DOCUMENTS

| 5,577,188 | A  | 11/1996 | Zhu |
| 5,608,872 | A  | 3/1997  | Schwartz et al. |
| 5,649,104 | A  | 7/1997  | Carleton et al. |
| 5,715,450 | A  | 2/1998  | Ambrose et al. |
| 5,761,419 | A  | 6/1998  | Schwartz et al. |
| 5,819,038 | A  | 10/1998 | Carleton et al. |
| 5,821,937 | A  | 10/1998 | Tonelli et al. |
| 5,831,610 | A  | 11/1998 | Tonelli et al. |
| 5,873,096 | A  | 2/1999  | Lim et al. |
| 5,918,159 | A  | 6/1999  | Fomukong et al. |
| 5,963,953 | A  | 10/1999 | Cram et al. |
| 5,983,227 | A  | 11/1999 | Nazem et al. |
| 6,092,083 | A  | 7/2000  | Brodersen et al. |
| 6,161,149 | A  | 12/2000 | Achacoso et al. |
| 6,169,534 | B1 | 1/2001  | Raffel et al. |
| 6,178,425 | B1 | 1/2001  | Brodersen et al. |
| 6,189,011 | B1 | 2/2001  | Lim et al. |
| 6,216,133 | B1 | 4/2001  | Masthoff |

(Continued)

OTHER PUBLICATIONS

H. Cui, "Link Prediction on Evolving Data Using Tensor-Based Common Neighbor," 2012 Fifth International Symposium on Computational Intelligence and Design, 2012, pp. 343-346, doi: 10.1109/ISCID.2012.237. (Year: 2012).*

(Continued)

Primary Examiner — Nicholas R Taylor
Assistant Examiner — Sanjoy Roy
(74) Attorney, Agent, or Firm — Schwabe Williamson & Wyatt

(57) ABSTRACT

Disclosed embodiments are related to grouping sets of intercommunicating objects to minimize the number of rules/policies needed to be stored to enforce those rules/policies. Given a set of objects communicating with each other using different services, embodiments group these objects to minimize the total number of final rules that are implemented. This allows an original set of policies to be reduced into a smaller set of policies, which conserves computational resources. Other embodiments may be described and/or claimed.

20 Claims, 12 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0114564 A1* | 5/2008 | Ihara ............... G06F 16/353 702/158 |
| 2008/0249972 A1 | 10/2008 | Dillon |
| 2009/0063415 A1 | 3/2009 | Chatfield et al. |
| 2009/0097418 A1* | 4/2009 | Castillo ............ H04L 41/5035 370/255 |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2015/0146555 A1* | 5/2015 | Mahimkar | H04W 24/08 370/252 |
| 2017/0168991 A1* | 6/2017 | Baskaran | G06F 17/16 |
| 2019/0005115 A1* | 1/2019 | Warner | G06F 17/18 |

OTHER PUBLICATIONS

Y. Zhao, L. T. Yang and R. Zhang, "Tensor-Based Multiple Clustering Approaches for Cyber-Physical-Social Applications," in IEEE Transactions on Emerging Topics in Computing, vol. 8, No. 1, pp. 69-81, Jan. 1-Mar. 2020, doi: 10.1109/TETC.2018.2801464. (Year: 2018).*

* cited by examiner

GROUP OPTIMIZATION FOR NETWORK COMMUNICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computer networks, and in particular to network security, information security, compliance and auditing.

BACKGROUND

Many organizations (orgs) operate private networks (sometimes referred to as "intranets," "enterprise networks," or the like), which require various network policies (or rulesets) to be enforced. The policies may be established and enforced for security purposes, regulatory compliance and auditing, and/or for internal organization-related purposes. Network policy enforcement involves making sure that only specific data flows are allowed in (and into) the network based on various rules defined by the network policy.

Typically, network elements owned or operated by the orgs (e.g., switches, routers, firewall computer appliances, proxy servers, etc.) store these policies or rulesets, and refer to the stored policies in order to filter out non-complying and/or suspicious network traffic. The size of these policies tends to increase, in terms of the number of rules per policy and the amount of memory (bits, bytes, etc.) required to store the policies, as new rules are created and/or as existing rules are amended. Rules are added and amended based on increasing complexity in org structure, increasing complexity and/or the addition of regulatory requirements, as well as new and/or more sophisticated security threats. The increasing size of network policies increases the use of computational resources needed to process the policies. This increased demand on computational and memory resources can cause bottlenecks or overload conditions to occur at the network elements thereby degrading the overall performance of the network.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
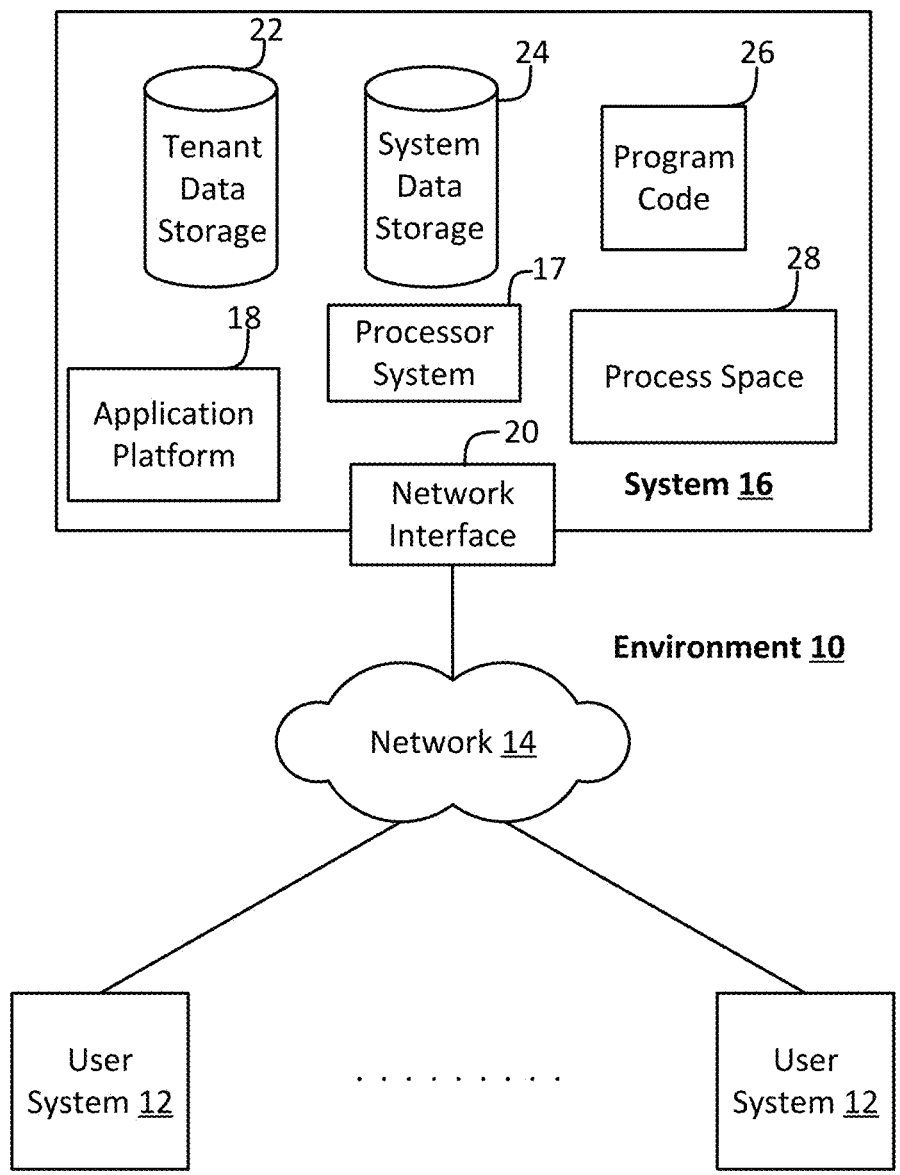
FIG. 1A shows an example environment in which an on-demand database service can be used according to various embodiments.

Disclosed embodiments are related to grouping sets of intercommunicating objects to minimize the number of rules/policies needed to be stored to enforce those rules/policies. Given a set of objects communicating with each other using different services, embodiments group these objects to minimize the total number of final rules that are implemented. Typically, various network elements (e.g., switches, routers, firewall computer appliances, proxy servers, etc.) store these policies in order to filter out non-complying and/or suspicious network traffic. However, the complexity in org structure, complexity of regulatory requirements, as well as new and/or more sophisticated security threats can cause an increase in policy size (in terms of the number of rules per policy and the amount of resources needed to store and process the policies). The increasing size of network policies increases the use of storage resources, as well as the use computational resources needed to process the policies.

Various embodiments use graph theory to model and optimize the communications between objects and reduce the size of these policies, which solves the above-mentioned problems. The embodiments can be applied to any set of objects that can communicate with one another, and are not limited to networking/firewall use cases discussed previously. In embodiments, a graph, a matrix, or a table is used to represent a set communication rules for one communication protocol or service. For example, one set of rules may pertain to email communications, and another set of rules may pertain to videotelephony (e.g., Skype®, Zoom®, etc.). In this example, a first graph, matrix, or table is used to represent the communication between objects using email, and a second graph, matrix, or table is used to represent the communication between objects using videotelephony. These graphs, matrices, or tables are combined to create a tensor, which can be represented as a 3D matrix. Each point in the tensor is a vector representing a rule in 3D space. A rule comprises a source that is allowed to, or able to, communicate with a destination using a service (or communication protocol).

Group optimization is performed after the tensor is created. Group optimization involves grouping two or more objects into source groups and destination groups ("S&D groups") for one or more services. A destination group is a set of two or more objects allowed to receive data from a given sender object using one or more services, and a source group is a set of two or more objects allowed to send data to a given destination object using one or more services. Next, optimized groups are created from the S&D groups. This involves scoring each S&D group based on the number of objects in the S&D group and the number of times the S&D group is identified as a group (or the number of S&D groups to which each object in the S&D group belongs) possibly across multiple services. The S&D groups with the highest scores are then identified as candidate (optimal) groups. The candidate (optimal) groups are then applied to the tensor. This implies that, for the corresponding services, new rules involving the optimal S&D groups are added to the tensor and the corresponding old rules, now redundant, are removed from the tensor. Removing the old, redundant, rules means replacing one or more rules involving a set of given objects and a given service, with the new rules involving the candidate (optimal) group to which the objects belong. In this way, a simplified tensor is created only including rules for the optimal groups and any objects not belonging to an optimal group.

The group optimization procedure discussed above (referred to as a "generalized group optimization algorithm" or "G2OA") uses a heuristic approach, exploiting cross-function correlation and cross-service correlation approaches for computer networks. The cross-function correlation approach means that a host group probably acts as a destination for some objects and as a source for other objects. As an example, a group of front-end servers could be identified as a destination group for some hosts and as a source group for the backend servers. This characteristic justifies the reuse of the same group as a source and as a destination group, and it might improve the single service compression. The cross-service approach means that different source groups probably need to access the same destination groups across different services. For example, the e-mail service might be available through different ports or using different protocols (e.g., encrypted and not encrypted), and therefore, the email server clusters might accept requests using SMTP and SMTPS/S services. In this scenario, groups of email clients may connect to the same destination groups (e.g., e-mail server clusters) using multiple ports or protocols. Therefore, reusing the same source (e.g., the email clients) and destination groups across (e.g., the email servers) across different services (SMTP and SMTPS) may improve the multi-protocol compression performances.

As mentioned previously, each rule is a vector in a 3D space having source, destination, and protocol axes. In embodiments, G2OA translates the simplified tensor into a list of 3D vectors representing the policy set. This translation can be performed by extracting the non-zero elements from the simplified tensor into a matrix, and transposing this matrix to obtain a list of 3D vectors in the 3D space, where each 3D vector includes source, destination, and service components. These 3D vectors represent the reduced or compressed (optimal) ruleset. Additionally, depending on how the rulebase is further organized, the ruleset can be sorted in any combination of the tuple comprising protocol, source, destination components.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows an example of an environment 10 in which on-demand services (e.g., cloud computing services and/or database services) can be used in accordance with various embodiments. The environment 10 includes user systems 12, a network 14, and system 16 (also referred to herein as a "cloud-based system," "database system," "cloud computing service," or the like). The cloud system 16 includes a processor system 17, an application platform 18, a network interface 20, tenant database 22 for storing tenant data 23 (see FIG. 1B), system database 24 for storing system data 25 (see FIG. 1B), program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

Figure 1B:
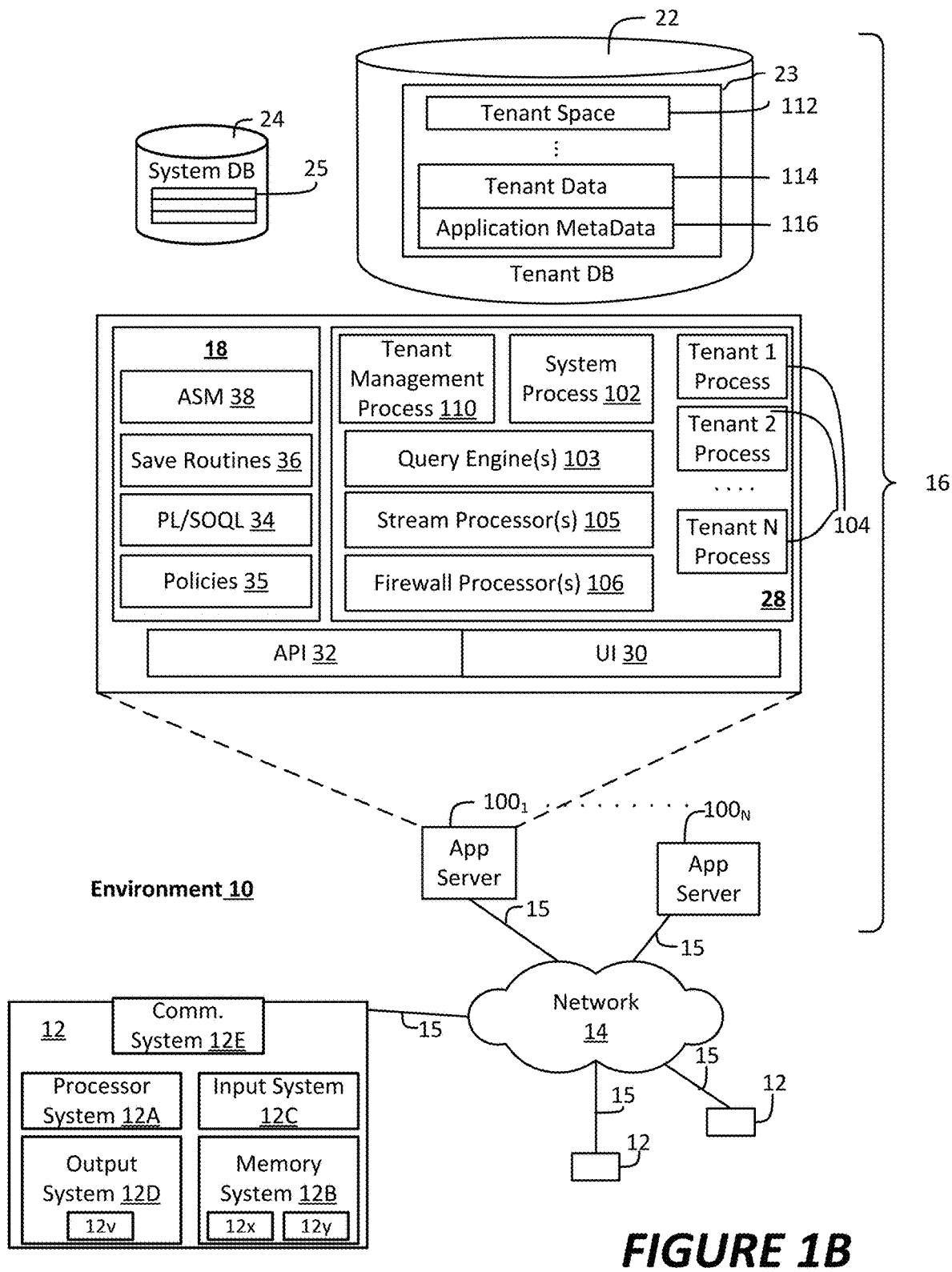
FIG. 1B shows an example implementation of elements of FIG. 1A and example interconnections between these elements according to various embodiments.

The system 16 may be a database system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant database system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

In embodiments, the tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), database objects, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and applications (e.g., application(s) 12$y$ in FIG. 1B) available to it from the system 16 over the network 14. In other implementations, each user system 12 may operate a web or user application (e.g., application 12$y$ in FIG. 1B) designed to interact with applications of the application platform 18 allowing a user (e.g., a subscriber of on-demand services provided by the system 16) of the user system 12 to access, process and view information, pages, interfaces (e.g., UI 30 in FIG. 1B), and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system/platform. The web, user, or third party application(s) 12$y$ discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like.

In an example, the user systems 12 may implement web, user, or third party applications 12$y$ to request and obtain data from database system 16, and render graphical user interfaces (GUIs) in an application container or browser. These GUIs may correspond with GUI 12$v$ and/or UI 30 shown and described with respect to FIG. 1B. In some implementations, the GUIs may include a data analytics GUI, such as Salesforce® Wave™ dashboard, which may provide visual representations of data (also referred to as visual representations 12$v$ or the like) residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the database system 16 so that the database system 16 may authenticate the identity of a user of the user system 12.

Each user system 12 typically includes an operating system (OS) 12$x$ to manage computer hardware and software resources, and provide common services for various applications 12$y$. The OS 12$x$ includes one or more drivers and/or APIs that provide an interface to hardware devices thereby enabling the OS 12$x$ and applications to access hardware functions. The OS 12$x$ includes middleware that connects two or more separate applications or connects applications 12$y$ with underlying hardware components beyond those available from the drivers/APIs of the OS 12$x$. The OS 12$x$ may be a general purpose OS or a platform-specific OS specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser/application container on a display (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers 100₁-100N. Each application server 100 (also referred to herein as an "app server", an "API server", an "HTTP application server," a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. In various embodiments, the process space 28 includes one or more query processors 103, one or more stream processors 105, and one or more firewall processors 106. The stream processor(s) 105 and firewall processor(s) 106 may be implemented as software components (e.g., software engines, software agents, artificial intelligence (AI) agents, modules, objects, or other like logical units), as individual hardware elements, or a combination thereof. In an example software-based implementation, the stream processor(s) 105 and firewall processor(s) 106 may be developed using a suitable programming language, development tools/environments, etc., which are executed by one or more processors of one or more computing systems (see e.g., processor system 17 of FIG. 1A). In this example, program code of the stream processor(s) 105 and firewall processor(s) 106 may be executed by a single processor or by multiple processing devices. In an example hardware-based implementation, the stream processor(s) 105 and firewall processor(s) 106 are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like.

The stream processor(s) 105 are systems and/or applications that send or receive data streams and execute the applications or analytics logic in response to detecting events or triggers from the data streams. The stream processor(s) 105 process data directly as it is produced or received and detect conditions from the data streams within a relatively small time period (e.g., measured in terms of milliseconds to minutes). The stream processor(s) 105 may be implemented using any stream/event processing engines or stream analytics engines such as, for example, Apache®

Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like.

The firewall processor(s) 106 are systems and/or applications that control the flow of network traffic between networks and/or between individual user systems within a network. The firewall processor(s) 106 can block, permit, or deny access to the inner components of the environment 10 based upon policies 35, which may be, or may include, a set of rules and other criteria. In one example, the firewall processor(s) 106 may be employed to prevent unauthorized access to the app server 100, tenant database 22, system database 24, and/or other aspects of system 16. In one example, the firewall processor(s) 106 may be employed to restrict connectivity or communications between internal networks used to service sensitive functions, such as accounting or personnel. In another example, an enterprise network may employ firewalls to restrict connectivity or communications between certain users in order to enforce compliance with regulatory requirements and/or organization-specific standards.

In some embodiments, the firewall processor(s) 106 perform packet filtering functions, which may include inspecting, in one or more packets, the source address (e.g., IP address), the destination address (e.g., IP address), the communication protocol or service being user to communicate between the source and destination, communication session characteristics (e.g., session source port and destination port), the interface being traversed by the packet and its direction, among others. In some embodiments, the firewall processor(s) 106 may track the state of a connection by inspecting certain values in the headers of the packets to identify the state of each connection (e.g., connection establishment, usage, and termination). In some implementations, the firewall processor(s) 106 can act an application-proxy gateway and/or as a Network Address Translator (NAT).

In some implementations, the firewall processor(s) 106 perform deep packet inspection. In these embodiments, the firewall processor(s) 106 may implement an inspection engine that analyzes protocols at the application layer to compare vendor-developed profiles of benign protocol activity against observed events to identify deviations. This allows a firewall to allow or deny access based on how an application is running over the network. For example, the firewall processor(s) 106 can determine whether an email message includes an attachment with an unauthorized file extension, whether a particular messaging application is being used over a particular port, whether certain commands are being issued or performed (e.g., writing files to an unauthorized destination), allow or deny access to resources containing particular types of content, allow or deny access to resources that have certificates signed or issued by a particular certificate authority, and/or the like.

According to various embodiments, firewall processor(s) 106 may also compress or otherwise reduce the amount of rules needed to enforce one or more policies 35. In such embodiments, the firewall processor(s) 106 generate a service adjacency tensor (SAT) in a three-dimensional (3D) space. The SAT comprises a plurality of vectors, where each vector represents respective rules for individual objects of a set of objects that communicate in a network using one or more services. The firewall processor(s) 106 generate one or more source groups and one or more destination groups for each object in the set of objects. Each destination group includes objects from the set of objects that are allowed to receive data from that object using one or more services, and each source group includes objects from the set of objects that can send data to that object using one or more services. Each of the one or more services may include any set of functionalities that is controlled by the policies 35, and may include, for example, communication services (including use of communication protocols, communication channels, Web services, APIs, a traffic types or traffic classes, etc.), utility services, application services, capability/infrastructure services, and/or the like. The firewall processor(s) 106 generate candidate groups from the source group(s) and the destination group(s) for each object, and apply the candidate groups to the SAT. Then, the firewall processor(s) 106 generate a new SAT comprising one or more new vectors. This new SAT is a simplified version of the previous SAT. Each vector in the new SAT represents a new rule for candidate groups communicating in the network using the one or more services. These and other aspects are discussed in more detail infra with respect to FIGS. 3-9.

The application platform 18 includes an application setup mechanism (ASM) 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 (also referred to as "rulesets" or the like) comprise documents and/or data structures that define a set of rules that govern the behavior of the firewall processor(s) 106 and/or other subsystems of the app server 100 when controlling network traffic flows. For example, one or more of the policies 35 may dictate how the firewall processor(s) 106 should handle network traffic for specific network addresses and address ranges, protocols, services, applications, content types, etc., based on an organization's information security (infosec) policies, regulatory and/or auditing policies, and the like. Additionally, the policies 35 can specify (within various levels of granularity) particular users, and user groups, that are authorized to access particular resources or types of resources, based on the org's hierarchical structure, and security and regulatory requirements.

The policies 35 in the application platform 18 may include operator (or service provider) policies 35, which are used to control data flows to or within the system 16; and/or tenant policies 35, which are used for controlling data flows and/or limit access to specific tenant data for a particular tenant/org. Both the operator and tenants may use any suitable programming languages, markup languages, schema languages, etc., to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein. The documents or data structures of the policies 35 may include a "description," which is a collection of software modules, program code, logic blocks, parameters, rules, conditions, etc., that may be used by the firewall processor 106 to control network flows, as well as share data with various resources. In some embodiments, the policies 35 may be, or may include, access control lists (ACLs), which are lists of permissions attached to an object specifying users, system processes, or other objects that are granted access to that object and operations that are allowed to be performed on the object. For computer networking implementations, the ACLs may indicate rules that are applied to port numbers and/or network addresses of a host, each with a list of hosts and/or networks permitted to use services provided by that host or via the port numbers and/or network addresses. In capirca implementations, the policies 35 may include one or more filters, where each filter contains one or more terms, and each term specifies basic network filter information such as addresses, ports, protocols, and actions. Additionally, the policies include one or more header sections followed by the one or more terms. The header sections specify a filter for a given direction communication, such as one filter for an input direction and one filter for an output direction. In some implementations, tenants (or developers associated with the tenants/orgs) can define or set the rules to be included in their respective policies 35 both through a suitable API 32 and/or through a web based graphical user interface (GUI) 30. Where APIs 32 are used, the policies 35 may be developed using any suitable mark-up or object notation language, such as the various languages, tools, etc. discussed herein.

As alluded to previously, the policies 35 may be amended to include new rules or updates to existing rules, and as such, the policies 35 may also include specific guidance on how to address changes to the rulesets making up the policies 35. The addition of new and/or updated rules to the policies 35 increases the size of the policies 35, which increases the amount of memory/storage resources needed to store the policies 35 and increases the amount of computational resources needed to perform the various firewall processing functions according to the policies 35. As discussed in more detail infra, the policies 35 may be reduced or compressed according to the various embodiments herein. In some embodiments, the policies 35 themselves may include rules, criteria, parameters, etc., used for reducing the rules making up the policies 35 according to the various embodiments discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 (also referred to as a "web service") to system 16 resident processes, which allow users or developers at user systems 12 to access the resident processes. In some implementations, application (app) code, app/service templates, and/or policies 35 developed by tenants may be pushed or otherwise sent to the system 16 using API 32. In these implementations, the app code, app/service templates, and/or policies 35 may be developed using a development (dev) environment, programming language(s), and/or dev-tools provided by the system 16. The API 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data. These endpoints specify where resources are located and/or how particular web services can be accessed. The application 12y may be used to generate and transmit a message (e.g., an HTTP message) with a user-issued query and a suitable URI/URL to access of an endpoint of the system 16. In embodiments, one or more of the public APIs may be an asynchronous ("async") query API, where the user-issued query includes an API call or other like instruction indicating that a user-issued query should be treated as an aysnc query (referred to as an "async query verb"). The async query verbs to invoke the async query API may be defined by API 32 and can be coded using PL/SOQL 34 or some other suitable programming or query language. When an async query invokes the async query API, an async query engine (e.g., query engine 103) or async query scheduler may generate a corresponding async query job. The term "job" as used herein refers to a unit of work or execution that performs work that comprises one or more tasks. Individual jobs may have a corresponding job entity comprising a record or database object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine 103, stream processor(s) 105, and firewall processor(s) 106 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 can be communicably coupled with tenant database 22 and system database 24, for example, having access to tenant data 23 and system data 25, respectively, via a different network connection 15. For example, one application server 1001 can be coupled via the network 14 (e.g., the Internet), another application server 100N-1 can be coupled via a direct network link 15, and another application server 100N can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the application servers 100 (see e.g., load balancer 228 of FIGS. 2A-2B discussed infra). Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (e.g., an application server 100 in the system 16) can automatically generate one or more native queries (e.g., SQL statements or SQL queries or the like) designed to access the desired information from a suitable database. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, database manager, compiler, execution engine, and/or other like components. In some implementations, each of the illustrated databases may generate query plans to access the requested data from that database, for example, the system database 24 can generate query plans to access the requested data from the system database 24. The term "query plan" generally refers to one or more operations used to access information in a database system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL database engines (e.g., DynamoDB® provided by Amazon.com®, MongoDB query framework provided by MongoDB Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® database systems, etc.), relational database (or "NewSQL") engines (e.g., InnoDB™ or My SQL Cluster™ developed by Oracle®, MyRocks™ developed by Facebook.com®, FaunaDB provided by Fauna Inc.), PostgreSQL database engines (e.g., MicroKernel Database Engine and Relational Database Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional database engines, extensible query execution engines, package query language (PaQL) execution engines, LegoBase query execution engines, and/or some other query engine used to query some other type of database system (such as any processing engine or execution technology discussed herein). In some embodiments, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Referring now to the user system 12 in FIG. 1B, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application 12y and/or other applications discussed herein) for carrying out the procedures, processes, methods, etc. of the embodiments discussed herein, as well as an operating system (OS) 12x and one or more databases or database objects (not shown).

The OS 12x manages hardware and software resources of the user system 12, and provides common services for the applications via one or more drivers and/or APIs that provide an interface to hardware devices thereby enabling the OS 12x and applications to access hardware functions. The OS 12x or some other code stored in memory system 12B may include middleware that connects two or more separate applications or connects applications with underlying hardware components beyond those available from OS 12x and/or the drivers/APIs. The OS 12x may be a general-purpose operating system or an operating system specifically written for/tailored to the user system 12.

The application(s) 12y is/are a software application designed to run on the user system 12 and is used to access data stored by the database system 16. The application 12y may be platform-specific, such as when the user system 12 is implemented in a mobile device, such as a smartphone, tablet computer, and the like. The application 12y may be a native application, a web application, or a hybrid application (or variants thereof). The application 12y may be developed using any suitable programming language and/or development tools such as any of those discussed herein. In some implementations, the application 12y may be developed using platform-specific development tools and/or programming languages such as those discussed herein. Suitable implementations for the OS 12x, databases, and applications 210, as well as the general functionality of the user system 12 are known or commercially available, and are readily implemented by persons having ordinary skill in the art, particularly in light of the disclosure herein.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The output system 12D is used to display visual representations and/or GUIs 12v based on various user interactions.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

Figure 2A:
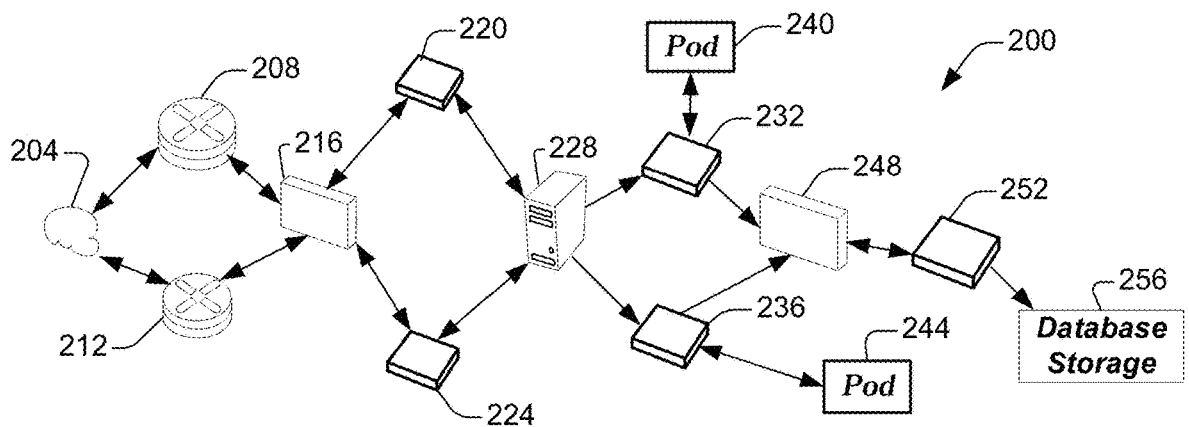
FIG. 2A shows example architecture of an on-demand database service environment according to various embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
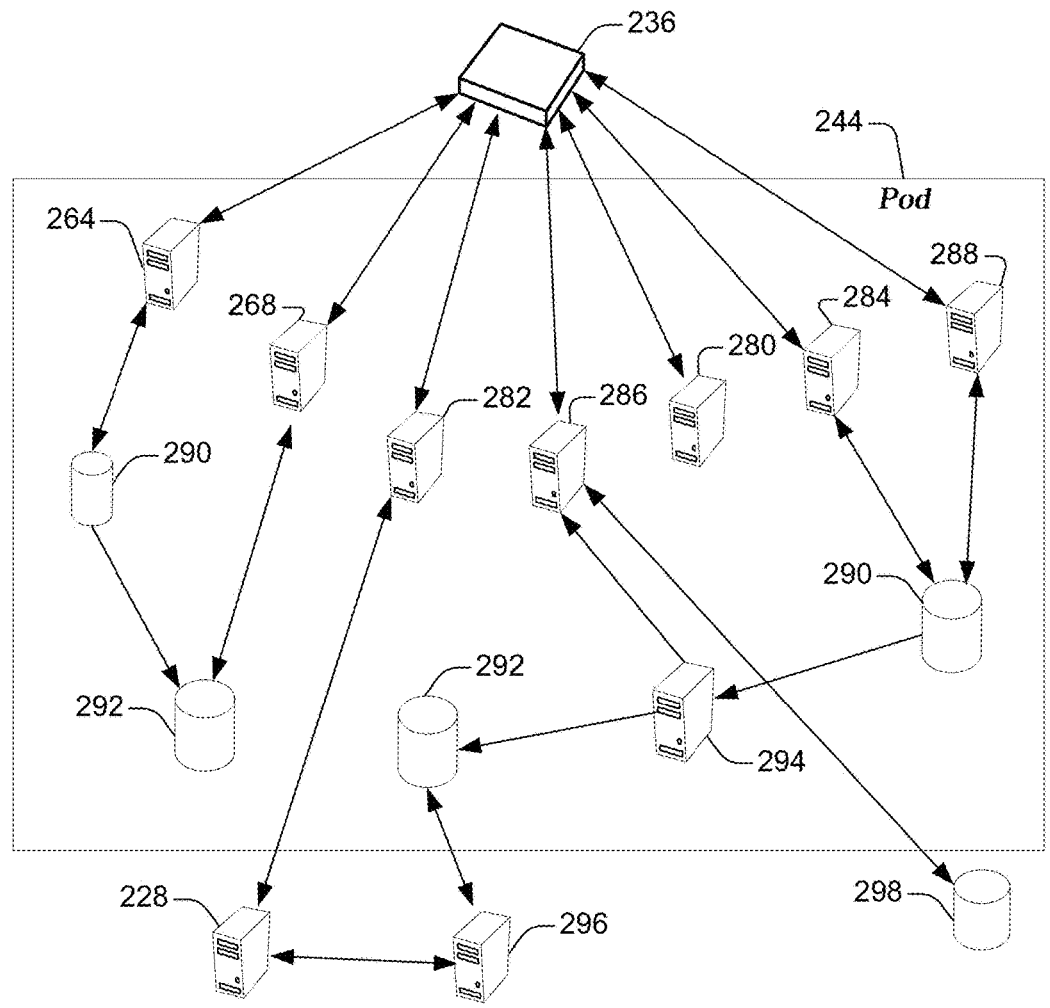
FIG. 2B shows example architectural components of the on-demand database service environment of FIG. 2A according to various embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. In some embodiments, firewall 216 may be an active firewall. The firewall 216 can block, permit, or deny access to the inner components of the on-demand database service environment 200 based upon a set of rules and other criteria (e.g., the policies 35 discussed previously). The firewall 216 can act as, or implement one or more of a packet filter, an application gateway, a stateful filter, a proxy server, virtual private networking (VPN), network access controller (NAC), host-based firewall, unified threat management (UTM) system, a Predictive Intelligence (PI) and/or FaaS such as described in commonly assigned U.S. patent application Ser. No. 15/847,229 titled AUTOMATED HOST-BASED FIREWALL CONFIGURATION MANAGEMENT filed on Dec. 21, 2017 and hereby incorporated by reference in its entirety and for all purposes, and/or any other type of firewall technology. Additionally, the firewall 216 may be equipped with the group optimization technologies discussed herein.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. In some implementations, the database firewall 248 is an active firewall. Additionally, the firewall 248 may be equipped with the group optimization technologies discussed herein. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file (force) servers 286, access control system (ACS) servers 280, batch servers 284, and app servers 288.

The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (e.g., programs, routines, scripts, etc.) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed with respect to FIGS. 1A-1B.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems (NFS) 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Generalized Group Optimization (G2O) Embodiments

The embodiments herein provide a heuristic approach to grouping sets of intercommunicating objects to minimize or otherwise reduce the number of rules and/or policies 35 governing the communication between the objects. In particular, the embodiments optimize the groupings of dataflow given a set of objects communicating with each other using different services or protocols. As alluded to previously, an example use case utilizing these embodiments involves securing network data flows and enforcing rules/policies for an organization (org). This involves making sure that only specific data flows are allowed within the internal network, only specific data flows are allowed into the internal network from outside, and only specific data flows are allowed from the internal network to outside the internal network.

As an example, a particular org may include multiple branches arranged in an org hierarchy, where each branch includes various object types such as managers, employees, contractors, and procurement. In the context of the present disclosure, these objects may be representations of specific computing systems (e.g., any of the systems devices discussed previously with respect to FIGS. 1A-1B and 2A-2B), instances of specific user sessions, and/or the like. In this example, an org policy 35 indicates that, for each branch, managers and employees can communicate with each other and with contractors, while contractors can communicate only with procurement-related objects. In embodiments, the ruleset in the org policy 35 may be reduced by grouping the managers and employees into an "internal" group and replacing the rules for the managers and employees with new rules for the internal group. Classifying the objects in this way can reduce the number or rules in a given policy 35, which reduces the amount of memory/storage space needed to store the policies 35 on various devices (e.g., app servers 100, firewalls 216 and 248, etc.). The freeing up of these memory/storage resource may improve the performance (e.g., in terms of latency, response time, etc.) of these devices/systems.

Figure 3:
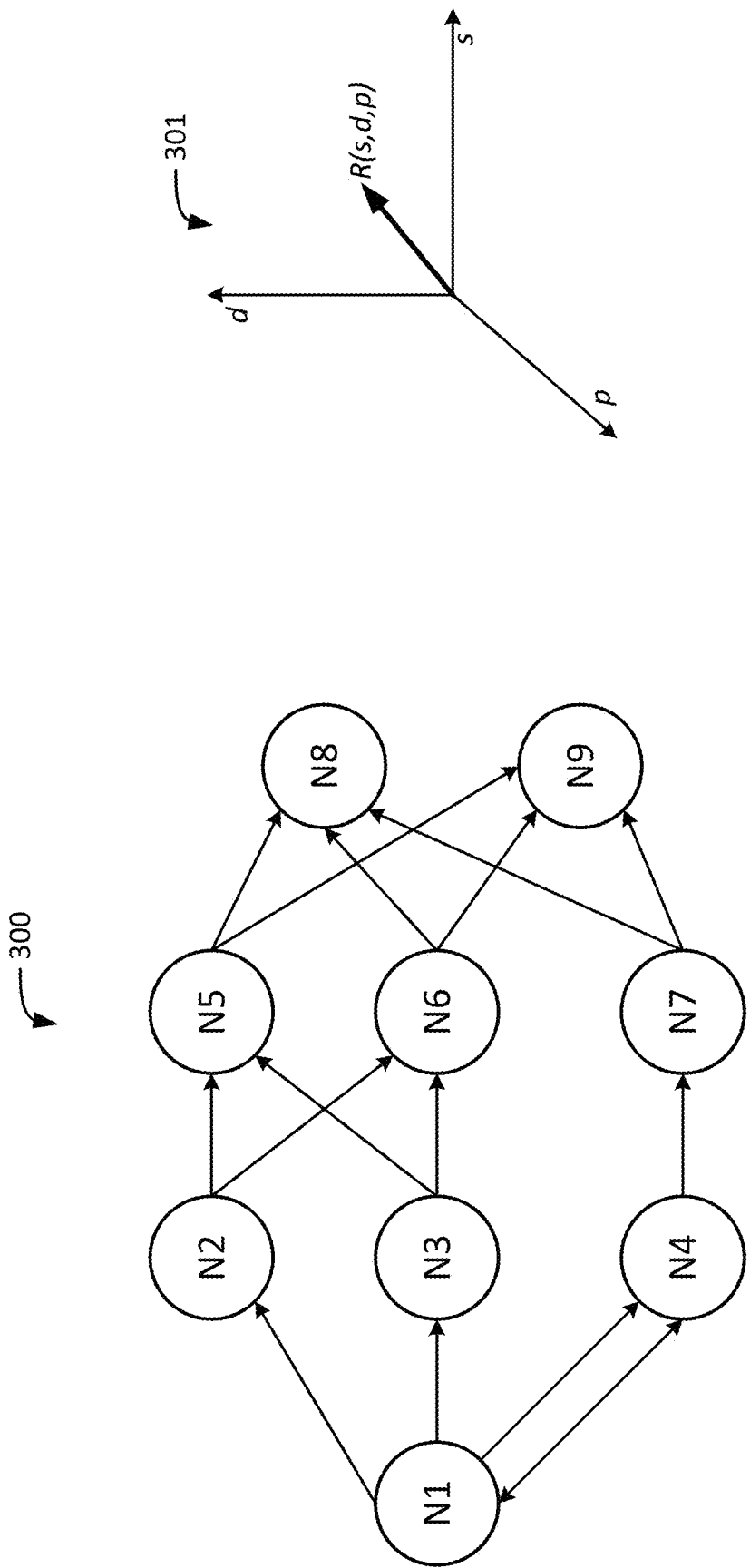
FIG. 3 illustrates an example service graph and an example rule vector according to various embodiments.

In various embodiments, a network of objects (or "network flow") is modeled using a suitable graphing algorithm, an example of which is shown by FIG. 3. FIG. 3 illustrates an example service graph 300, which is a graphical representation of a network flow for a given service. A "graph" in this context refers to a data structure or data type that comprises a number of (or set of) nodes (also referred to as "vertices," "points," or "objects"), which are connected by a number of (or set of) edges, arcs, or lines. A graph may be an undirected graph having edges with no orientation, or a directed graph having oriented edges. An edge has two or more vertices to which it is attached, called endpoints. Edges may also be directed or undirected; undirected edges are also referred to as "lines" and directed edges are also referred to as "arcs" or "arrows." An undirected edge between two nodes can be represented as a pair of arcs connecting the same nodes in the opposite directions, and therefore, it is possible to transform an unoriented graph into an oriented one (whereas the opposite transformation is not usually possible). Two or more vertices forming an edge may be referred to as the "endpoints" of that edge. The service graph 300 of FIG. 3 is a directed graph. Each of the directed edges (or arrows) is shown by a line with an arrowhead at one end of the line. The directed edges (or arrows) represent a direction of communication (or data flow) from one node ("source") to another node ("destination"). In particular, the node attached to the end of an edge without the arrowhead is a source node and the node attached to the end of an edge with the arrowhead is a destination node. Although the example embodiments are described herein with respect to graphs, the embodiments may also be applicable to using hypergraphs, which are graphs with multiple edges.

In the example of FIG. 3, the service graph 300 includes nine nodes (or objects), labeled node 1 (N1) to node 9 (N9). The service graph 300 shows the interconnections between the objects for a single service. In this context, the service may be any discrete function within an environment represented by the service graph 300. As examples, individual services may include communication services, utility services, application services, capability/infrastructure services, and/or the like.

Each of the nodes (or vertices) N1-N9 may represent individual hosts (e.g., any resource connected to a network such as computing systems/devices, users, tenants, etc.), host groups, or networks. In some embodiments, each of the nodes (or vertices) N1-N9 may represent individual objects, variables, instance variables, properties, data types, data structures, functions, methods, memory locations/spaces, classes, modules, software engines, table, row/record, column/field, database objects, etc., in a programming/database development paradigm. In some embodiments, the numbers or values included in the nodes may be an identifier of an entity represented by that node, or some other attribute or piece of data that describe each instance of that node.

Each arrow in the service graph 300 represents a rule allowing a specific communication flow between two nodes, and can be seen as a policy element of the policies 35 allowing a specific communication between peer nodes using a particular communication protocol (service). In embodiments, a rule R includes a source s to a destination d using service p. In networking/firewall implementations, the service component p is a network service or protocol, and the rule R is (or includes) a tuple containing the protocol, source port(s), and destination port(s). Examples of such rules R may include "tcp/any/80" or "tcp/1024-65535/80", which may represent two different services. Some optimization can be performed if, for example, two services have identical destination port(s) and protocol, and the source port(s) of one service is a subset of the other service. These optimizations should be performed in the pre-processing phase. According to various embodiments, each rule R may be expressed as a 3D rule vector, such a rule vector 301. A vector is a quantity having a direction and a magnitude, which may be used to determine the position of one point in space relative to another. The rule vector 301 represents a rule R as a physical 3D quantity with a magnitude and direction in a 3D space. This 3D space includes a source direction (or axis) s, a destination direction (or axis) d, and a service direction (or axis) p. The rule vector 301 comprises three components including a source component s, a destination component d, and a service component p. These components define the magnitude and direction of the rule vector 301.

Each arc connecting two endpoints in the service graph 300 constitute a rule R. The collection of rules R in the service graph 300 are part of an individual policy 35. For the sake of clarity, in this example each rule R in the service graph 300 have the same service component p. The graph 300 is a representation of all the data flows allowed for a given service. In embodiments, the policies 35 can be represented by a tensor, such as a Service Adjacency Tensor (SAT) comprising all the rules for all the services. The rules belonging to policies 35 for a specific service can be represented using an adjacency matrix (that is also a "frontal" slice of the SAT, see e.g., FIG. 5), which is referred to as a Service Adjacency Matrix (SAM). Generally, an element $A_{ij}$ in an adjacency matrix A is one ("1") when there is an edge from vertex i to vertex j and zero ("0") when there is no edge from vertex i to vertex j. Adjacency matrices are also used as data structures for the representation of graphs where the elements of the adjacency matrix indicate whether pairs of vertices are connected (adjacent) or not in the graph. In embodiments, an element $S_{ij}$ in a SAM S is set to one ("1") when communication using a given protocol from vertex i to vertex j is allowed, and zero ("0") when communication using the given protocol from vertex i to vertex j using is not allowed.

The SAM is a service-specific adjacency matrix or other like multi-dimensional array or arrangement of numbers, symbols, or expressions representing a subset of the policy 35. For a given service, an SAT represents a policy 35, including all the rules allowing communication between nodes/objects using the given communication protocol of that policy 35. An example SAM for the service graph 300 of FIG. 3 is shown by table 1.

TABLE 1 example Service Adjacency Matrix (SAM)

|   |    | d  |    |    |    |    |    |    |    |    |
|---|----|----|----|----|----|----|----|----|----|----|
|   |    | N1 | N2 | N3 | N4 | N5 | N6 | N7 | N8 | N9 |
| s | N1 |    | 1  | 1  | 1  |    |    |    |    |    |
|   | N2 |    |    |    |    | 1  | 1  |    |    |    |
|   | N3 |    |    |    |    | 1  | 1  |    |    |    |
|   | N4 | 1  |    |    |    |    |    | 1  |    |    |
|   | N5 |    |    |    |    |    |    |    | 1  | 1  |
|   | N6 |    |    |    |    |    |    |    | 1  | 1  |
|   | N7 |    |    |    |    |    |    |    | 1  | 1  |
|   | N8 |    |    |    |    |    |    |    |    |    |
|   | N9 |    |    |    |    |    |    |    |    |    |

In table 1, the rows indicate source nodes, and the columns indicate destination nodes. The cells including a value of "1" indicate that communication using a specific service from the source node to a destination node is permitted by the policy 35, and each blank cell (representing a value of "0") indicates that communication between the nodes is not permitted by the policy 35. For example, reading row N1 to row N9, table 1 shows that:

Source N1 can communicate with destinations N2, N3, and N4;

Source N2 can communicate with destinations N5 and N6;

Source N3 can communicate with destinations N5 and N6;

Source N4 can communicate with destinations N1 and N7;

Source N5 can communicate with destinations N8 and N9;

Source N6 can communicate with destinations N8 and N9;

Source N7 can communicate with destinations N8 and N9;

Source N8 can communicate with no destination nodes; and

Source N9 can communicate with no destination nodes.

In the service state, the firewall processor(s) 106 enforce each rule R in the 3D space, each of which comprises a source, destination, and protocol (s,d,p). Usually, firewall rules and SAT or the SAM of table 1 or the graph 300 are disconnected models. In various embodiments, these models are unified into a single model to optimize the rules. An example of this combination is shown by FIG. 4.

Figure 4:
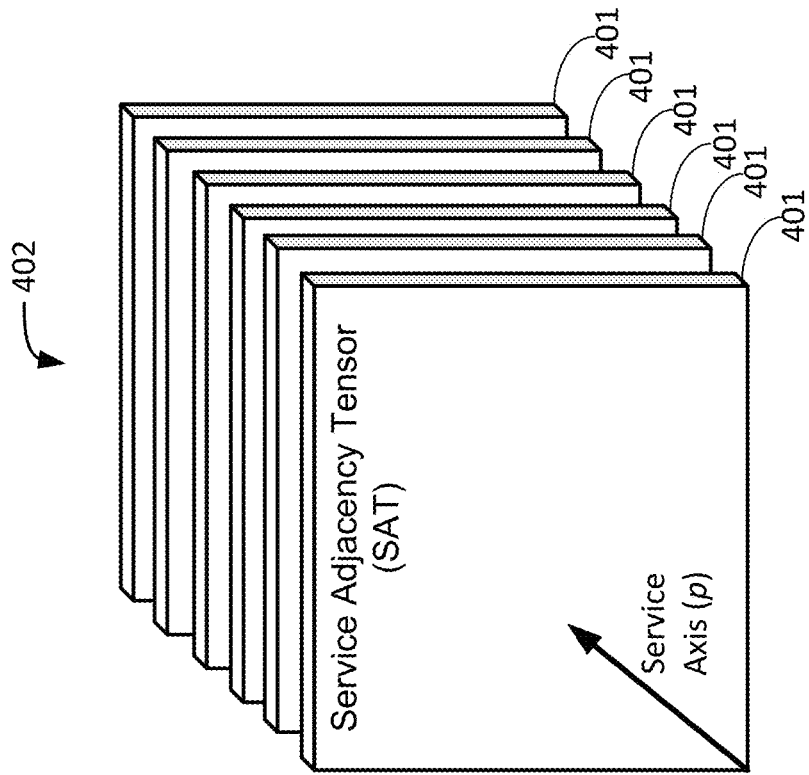
FIG. 4 shows an example service adjacency matrix (SAM) and an example Service Adjacency Tensor (SAT) according to various embodiments.
Figure 4:
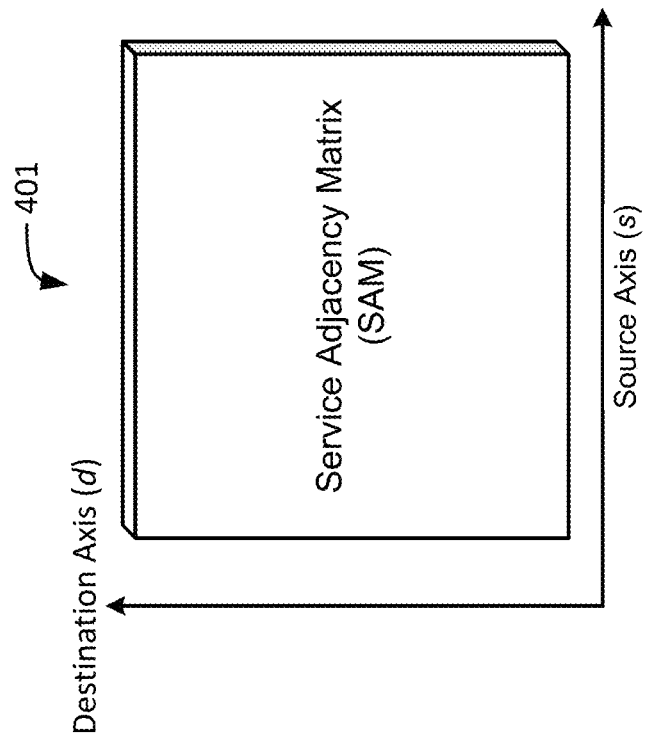

FIG. 4 shows an example service adjacency matrix (SAM) 401 and an example Service Adjacency Tensor (SAT) 402 according to various embodiments. The SAM 401 may be the same or similar to the SAM represented by table 1 (discussed supra), which is shown in a 3D space. Each point in the SAM 401 for a specific service is a rule R (not shown by FIG. 4), where each rule R is expressed as a 3D rule vector (e.g., rule vector 301 of FIG. 3). As mentioned previously, a rule vector 301 represents rule R and includes a source s, a destination d, and a service p. In this example, the SAM 401 is shown along a source axis and a destination axis because the SAM 401 represents a ruleset for a single service p.

According to various embodiments, a set of policies 35 may be represented as a Service Adjacency Tensor (SAT) 402, which comprises a plurality of service-specific SAMs 401. A tensor is a algebraic object analogous to, but more general than, a vector, which is represented by arrays of components that are functions of the coordinates of a space. For purposes of the present disclosure, a tensor is represented by a 3D matrix (an ordered group of 2D matrices called SAMs). The SAT 402 models the policies 35, describing the communication rules for multiple services p between multiple objects. The basic construct is to model the policies 35 as a group of rule vectors 301 in a 3D space. This implies identifying a tensor, such as the SAT 402, representing all possible rules in a given network. In this example, each of the SAMs 401 making up the SAT 402 comprises the set of service-specific rules R for respective services p. Combining multiple service-specific SAMs 401 creates the SAT 402 in the 3D space. Additionally, each of the SAMs 401 making up the SAT 402 may be represented by a table or matrix that is similar to table 1 discussed previously. Each of these tables or matrices define service-specific rules between a source and a destination using a service, and each table or matrix is a representation of a graph that is similar to service graph 300.

The problem of reducing the number of rules is basically a problem of linear combination (change base vectors), and can be tackled from different perspectives. In the present disclosure, a heuristic, less formal, approach is used to reduce the number of rules. In embodiments, the SAT 402 may be created according to the algorithm shown by table 2.

TABLE 2 example SAT algorithm

Create the structures
    1. Generate a Rules Vector (or Services Vector):
        a. Identify all rules (or services) in terms of:
            <service><source><destination>
        b. Create a vector S of size m containing all the identified rules (or services).
    2. Generate a Nodes Vector:
        a. Identify all objects in a network
        b. add the identified objects to a vector N of size n
    3. Generate a Service Adjacency Tensor (SAT) according to one or both of the following:
        a. $SAT_{s,d,p} = 1$ IFF node $N_s$ can communicate with $N_d$ using service $S_p$ ($s \neq d$)
        b. $SAT_{s,s,p} = 0$ ∀ s,p ($N_s$ can always communicate with itself, but in the SAT the diagonal may be set to zero to simplify the sum)

NOTE1:
IFF ("if and only if") is a mathematical and logical connector indicating that either both statements are true or both are false
NOTE2:
∀ ("for all" or "for each and every") is a mathematical and logical connector of a universal quantifier, indicating a predicate is true for all members of a specified set.

In table 2, $N_d$ refers to a given destination node, $N_s$ refers to a given source node, $SAT_{s,d,p}$ refers to a SAT cell containing a rule for a source communicating with a destination using a particular service p, and $SAT_{s,s,p}$ refers to an SAT cell containing a rule for a source communicating with itself using the service p.

Figure 5:
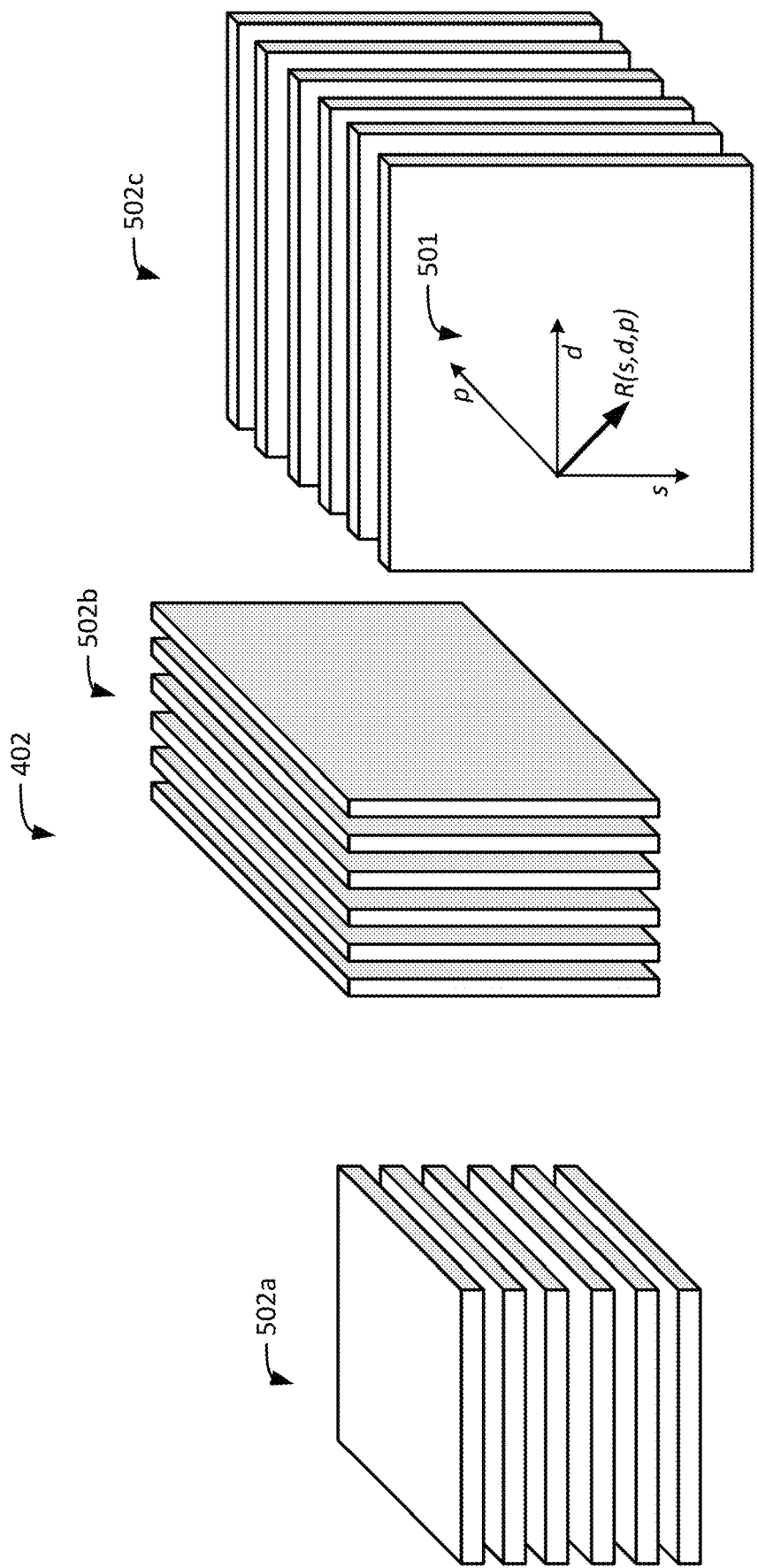
FIG. 5 shows various slices of the SAT of FIG. 4, including horizontal, vertical, and frontal slices, according to various embodiments.

FIG. 5 shows various slices of SAT 402 including horizontal slices 502a in the source (s) plane ($X_{s,:,:}$), vertical/lateral slices 502b in the destination (d) plane ($X_{:,d,:}$), and frontal slices 502c ($X_{:,:,p}$). Each horizontal slice 502a of the SAT 402 in the s plane ($X_{s,:,:}$) represents all possible destinations with which a given source $N_s$ is allowed to communicate. Each lateral/vertical slice 502b of the SAT 402 in the d plane represents all sources that are allowed to communicate with a given destination $N_d$ ($X_{:,d,:}$). Each frontal slice 502c of the SAT 402 in the p plane is a service-specific SAM 401, representing the adjacencies between different nodes for a given service ($X_{:,:,p}$ or $X_p$) or in other terms, all the rules allowing communications between nodes for a given service. Regardless of how the SAT 402 is sliced, each component of the SAT 402 is a firewall rule R, an example of which is depicted in the frontal slices 502c. The rule vector 501 may be the same or similar to the vector rule 301 discussed previously with respect to FIG. 3. The total number of rules in the SAT 402 may be expressed by the following equation:

$$R = \sum_{s=1}^{n} \sum_{d=1}^{n} \sum_{p=1}^{m} \alpha_{s,d,p}$$

In the equation above, alpha ($\alpha_{s,d,p}$) represents a value in the SAT 402 wherein a value of "1" indicates that a source s is allowed to communicate with destination "d" using protocol "p", and a value of "0" indicates that a source s is not allowed to communicate with destination "d" using protocol "p".

Group Optimization as a Linear Combination Problem.

From a strictly algebraic standpoint reducing the rulesets for communicating objects can be described as a linear combination process transforming a tensor S into a new tensor S' in such a way that (1) the internal sum of S' (R') has a minimal value, and (2) if S allows the communication between two nodes, then S' must allow the communication between the same nodes.

In various embodiments, Generalized Group Optimization (G2O) is used to reduce or minimize a set of rules and services describing the interconnections of a set of objects by grouping the objects to minimize the amount or number of rules. In some embodiments, the following rules may apply to the created groups: (a) each group contains at least two objects (or nodes); (b) a group can contain only objects, or groups of groups are not allowed; and (c) an object can be member of multiple groups. Some embodiments include recursive G2O, were the creation of "groups of groups" is permitted.

The G2O embodiments provide a heuristic approach to group optimization in the computers networks domain. Such G2O embodiments may be based on cross-function correlation characteristics of computers networks, wherein a group of objects may act as a destination for some objects and as a source for other objects. In the computer network domain, the group of objects may include a group of servers such as one or more servers in a rack or the like. As an example, a group of frontend servers could be identified as a destination group for some hosts and as a source group for one or more backend servers. This characteristic allows the same group to be reused as a source group and as a destination group, and may improve the single-service (e.g., SAT frontal slice) compression. The G2O embodiments in the computers networks domain may also be based on cross-service correlation characteristics of computers networks, wherein different source groups may need to access the same destination groups across different services, such as when a service is provided through different ports. As an example, a mail server group may provide Simple Mail Transfer Protocol (SMTP), SMTPS Secure (SMTPS or SMTP/S), and Quick Mail Transfer Protocol (QMTP) services. Therefore, reusing the same source and destination groups across different services may improve multi-protocol compression performances.

Figure 6:
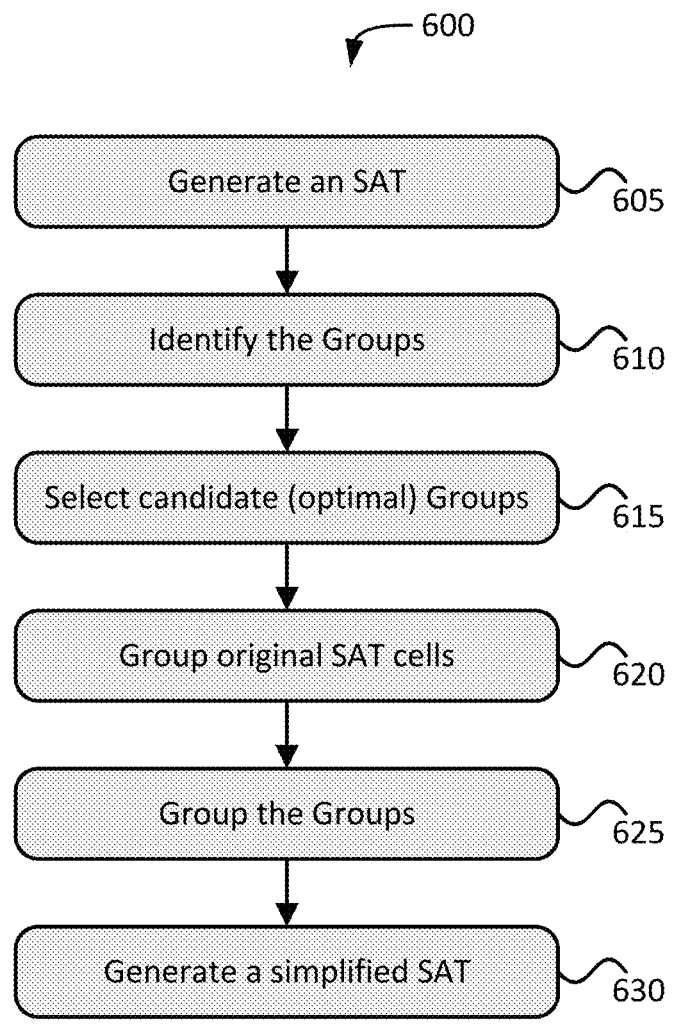
FIG. 6 shows an example G2O algorithm (G2OA) according to various embodiments.

FIG. 6 shows an example G2O algorithm (G2OA) 600 according to various embodiments. In embodiments, a firewall processor 106 may operate the G2OA 600. The G2OA 600 begins at operation 605 where the firewall processor 106 generates an SAT 402. In embodiments the SAT 402 is created, for each service p, for each source s, and for each destination d, such that each cell of $SAT_{s,d,p}=1$ IFF the node $N_s$ can communicate with node $N_d$ using service $S_p$ wherein $s \neq d$, and/or $SAT_{s,s,p}=0$ ∀s, p. As alluded to previously, $R = \sum_{s=1}^{n} \sum_{d=1}^{n} \sum_{p=1}^{m} \alpha_{s,d,p}$ ∀α a in the SAT 402 is the number of rules in SAT 402.

At operation 610, the firewall processor 106 identifies one or more groups. In embodiments, for each service, and for each destination the firewall processor 106 identifies one or more Destination Groups (DG) and one or more Source Groups (SG). At the end of this operation, each $DG_{p,s}$ will contain all the destination nodes with whom each source node $N_s$ "talks" using service $S_p$, and each $SG_{p,d}$ will contain all the source nodes with whom a destination node $N_d$ "talks" using service $S_p$.

At operation 615, the firewall processor 106 selects the candidate (optimal) groups from among the groups identified at operation 610. In embodiments, the firewall processor 106 places all the SGs and DGs in a vector G, and score each member of G across different services. The score of each group is equal to the number of times the group appears (e.g., across all services) multiplied by the cardinality of the group minus one. Note that card(G) is a positive number, and G cannot contain more than $2^n-n-1$ groups because, as discussed previously, each group must contain at least two objects. In some cases, all groups will be as small as possible, and different across different protocols, therefore, $2 \leq Card(G) \leq 2^n-n-1$. In some cases, the minimum number of items per groups is one parameter of G2OA. Next, the firewall processor 106 sorts G per score, and picks up the "best" groups. In some embodiments, if a group $G_a$ is a subgroup of a group $G_A$ such as $Score(G_a) \geq Score(G_A)$, then the firewall processor(s) 106 remove the supergroup $G_A$ from the group vector G. In some embodiments, the parameter K is the maximum number of groups. In such embodiments, the firewall processor 106 picks the first K groups from G as the "best" groups.

At operation 620, the firewall processor 106 groups the original SAT cells. In embodiments, the firewall processor 106 adds K rows ("group rows" or "G rows") and K columns ("group columns" or "G columns") to the SAT 402. In other words, the firewall processor 106 expands the SAT 402 to include K number of additional rows as G rows and K number of additional columns as G columns, and assign each group to a respective G row and a respective G column. Next, moving along the p axis, the firewall processor 106 applies the groups per row, where, for each kin card(G) set $SAT_{s,k,p}=1$ if $SAT_{s::p}$ contains $G_k$ (e.g., if the "s-th" row contains the group $G_k$). Then, moving along the p axis, the firewall processor 106 applies the groups per column, where, for each k in card(G) set $SAT_{k,d,p}=1$ if $SAT_{:d:p}$ contains $G_k$ (e.g., if the "d-th" column contains the group $G_k$). Then, for all the cells in the original SAT 402 applied to a group cell are set to a value of zero.

At operation 625, the firewall processor 106 groups the group cells ("group the groups"). In embodiments, the firewall processor 106 applies the groups to group rows and group columns. Then, all the cells applied to a group cell are set to a value of zero.

Figure 8:
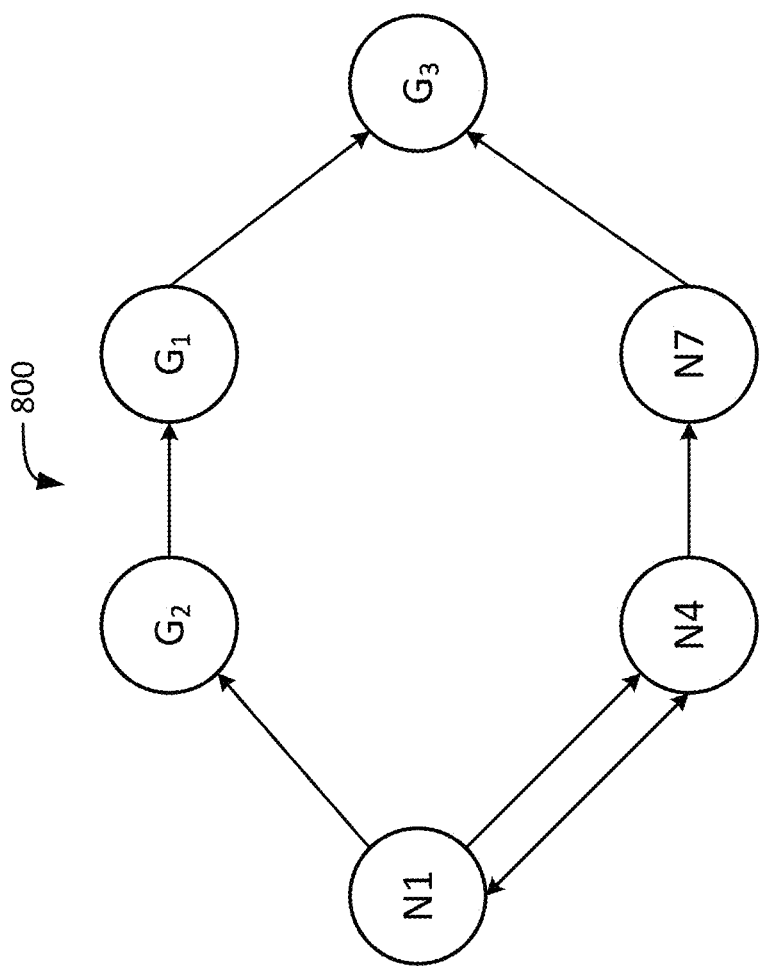
FIG. 8 illustrates a service graph of a simplified SAT according to various embodiments.

At operation 630, the firewall processor 106 generates a simplified SAT (see e.g., SAT 800 of FIG. 8). In embodiments, the firewall processor 106 identifies the non-zero rules (services, sources, and destinations), and create three vectors P', S', and D'. For each service if $SAM_{p::} \neq [0]$, then the firewall processor 106 adds p to P', scan the SAT 402 per row, and scan the SAT 402 per column. For the row scan, if $SAT_{s::p} \neq Row(0)$ then the firewall processor 106 adds s to S'. For the column scan, if $SAT_{:d:p} \neq Column(0)$ then the firewall processor 106 adds d to D'. Next, the firewall processor 106 creates a new service adjacency tensor, SAT', of size card (P')×card(S)×card (D). For each p in P', for each s in S', and for each d in D', $SAT'_{s,d,p}=SAT_{s,d,p}$. In some embodiments, SAT' contains only the non-zero service, row, and column vectors of the SAT 402. Additionally, $R'=\Sigma_{s=1}^{n}\Sigma_{d=1}^{n}\Sigma_{p=1}^{m}\alpha'_{s,d,p} \forall \alpha'$ in SAT' is the number of rules in the SAT', and R'≤R wherein R-R' is the number of rules that have been removed from the SAT 402 to make the SAT' and C=1-R'/R represents the rule compression (efficiency) of the G2OA. After operation 630, the G2OA 600 may end or repeat as necessary.

Figure 7:
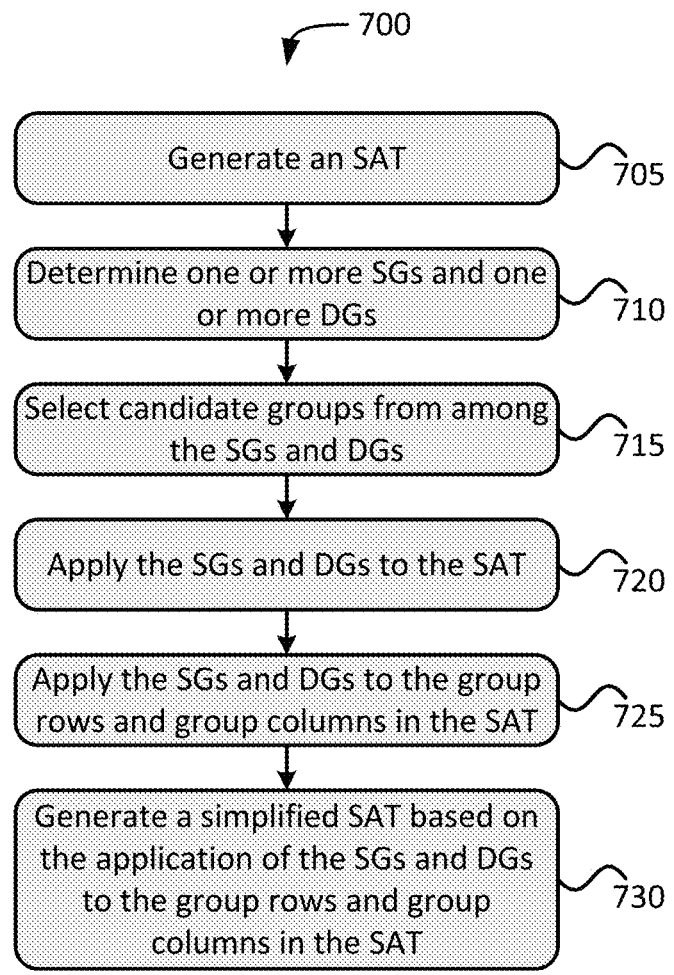
FIG. 7 shows another example G2OA according to various embodiments.

FIG. 7 shows another example G2OA 700 according to various embodiments. In embodiments, a firewall processor 106 may operate the G2OA 700. Various operations of applying the G2OA 700 to a single service network are also described with reference to FIGS. 3-5 and 8. In this example, the G2OA is applied to a network of nine hosts represented by nodes N1 to N9 for one service as shown by service graph 300 in FIG. 3. In this example, the SAM of table 1 is equivalent to the SAT 402 (SAM≡SAT), and the service dimension p=1.

The G2OA 700 begins at operation 705 where the firewall processor 106 generates the SAT 401, an example of which is shown by table 3. Table 3 is a reproduction of table 1 discussed previously.

TABLE 3

|    | N1 | N2 | N3 | N4 | N5 | N6 | N7 | N8 | N9 |
|----|----|----|----|----|----|----|----|----|----|
| N1 |    | 1  | 1  | 1  |    |    |    |    |    |
| N2 |    |    |    |    | 1  | 1  |    |    |    |
| N3 |    |    |    |    | 1  | 1  |    |    |    |
| N4 | 1  |    |    |    |    |    | 1  |    |    |
| N5 |    |    |    |    |    |    |    | 1  | 1  |
| N6 |    |    |    |    |    |    |    | 1  | 1  |
| N7 |    |    |    |    |    |    |    | 1  | 1  |
| N8 |    |    |    |    |    |    |    |    |    |
| N9 |    |    |    |    |    |    |    |    |    |

At operation 710, the firewall processor 106 determines one or more destination groups and one or more source groups. Recall that the rows of the SAM/SAT 402 include the source nodes and the columns of the SAM/SAT 402 include the destination nodes. To identify (or create) the destination groups, the firewall processor 106 scans each row of the SAM/SAT 402, and create a DG for each row with more than one non-zero cell. For example, scanning table 3 in order from row N1 to row N9, a $DG_{N1}$ is created to include N2, N3, and N4; the second row (row N2), a $DG_{N2}$ is created to include N5 and N6; and so forth. Similarly, for identifying (or creating) the source groups, the firewall processor 106 scans each column of the SAM/SAT 402, and create an SG for each column with more than one non-empty cell. For example, scanning table 3 in order from column N1 to column N9, no SGs are created until the fifth column (column N5) is reached wherein an $SG_{N5}$ is created to include N2 and N3; an $SG_{N2}$ is created to include N2 and N3; and so forth. In the present example, the following DGs and SGs are created/identified:

$DG_{N1}$={N2, N3, N4}
$DG_{N2}$={N5, N6}
$DG_{N3}$={N5, N6}
$DG_{N4}$={N1, N7}
$DG_{N5}$={N8, N9}
$DG_{N6}$={N8, N9}
$DG_{N7}$={N8, N9}
$SG_{N5}$={N2, N3}
$SG_{N6}$={N2, N3}
$SG_{N8}$={N5, N6, N7}
$SG_{N9}$={N5, N6, N7}

At operation 715, the firewall processor 106 selects candidate or optimal groups from among the DGs and SGs.

First, the firewall processor 106 determines scores for each of the DGs and SGs. In embodiments, the score for each group is represented by a value S, where $S=(I_{DG,SG}-1)*X_{DG,SG}$. In this equation, S is the group score, $I_{DG,SG}$ is the number of items in the group, and $X_{DG,SG}$ is the number of times the group is identified as a group or as a subgroup. In the present example, the DGs and SGs are scored as shown by table 4.

TABLE 4

| Group (DG or SG) | Score (S) |
|---|---|
| $DG_{N1}$ = {N2, N3, N4} | S = (3 − 1)*1 = 2 |
| $DG_{N2}$ = $DG_{N3}$ = {N5, N6} | S = (2 − 1)*4 = 4 |
| $DG_{N4}$ = {N1, N7} | S = (2 − 1)*1 = 1 |
| $DG_{N5}$ = $DG_{N6}$ = $DG_{N7}$ = {N8, N9} | S = (2 − 1)*3 = 3 |
| $SG_{N5}$ = $SG_{N6}$ = {N2, N3} | S = (2 − 1)*3 = 3 |
| $SG_{N8}$ = $SG_{N9}$ = {N5, N6, N7} | S = (3 − 1)*2 = 4 |

Next, the firewall processor 106 identifies the candidate groups (G) based on the determined scores. In some embodiments, if two groups have the same score, the smallest group among the two groups is selected. In the present example, using the scores from table 4, the following groups ($G=(G_1, G_2, G_3)$) are selected from the DGs and SGs.

$G_1$={N5, N6}
$G_2$={N2, N3}
$G_3$={N8, N9}

Note that in table 4, $DG_{N1}$ has an X value of 1 because the grouping of N2, N3, and N4 only appear in $DG_{N1}$; $DG_{N2}$ and $DG_{N3}$ have an X value of 4 because N5 and N6 exist as a "main group" in $DG_{N2}$ and $DG_{N3}$ as well as a subgroup in $SG_{N8}$ and $SG_{N9}$; $DG_{N4}$ has an X value of 1 because N1 and N7 only appear in $DG_{N4}$; $DG_{N5}$, $DG_{N6}$, and $DG_{N7}$ have an X value of 3 because N8 and N9 appear as a main group in $DG_{N5}$, $DG_{N6}$, and $DG_{N7}$, but not as a subgroup in any other DG or SG; $SG_{N5}$ and $SG_{N6}$ have an X value of 3 because N2 and N3 appear as a main group in $SG_{N5}$ and $SG_{N6}$ as well as a subgroup in $DG_{N1}$; and $SG_{N8}$ and $SG_{N9}$ have an X value of 2 because N5, N6, and N7 exist as a main group in $SG_{N8}$ and $SG_{N9}$, and are not a subgroup in any other DG or SG.

At operation 720, the firewall processor 106 applies the groups to the SAM/SAT 402. In embodiments, the firewall processor 106 expands the SAM/SAT 402 to include K number of G rows and K number of G columns, and add the groups to respective G rows and respective G columns. Then, the firewall processor 106 determines/identifies the groups per row, and determines/identifies the groups per column. After the groups per row and groups per column are identified, the cells corresponding to those identified G rows and G columns are set to zero (0). In the present example, table 5 shows the groups $G_1$, $G_2$, $G_3$ as applied to the SAM/SAT 402 where the cells including an "X" indicate the identified and removed cells, and the boldened cells indicate the newly set group cells.

TABLE 5

| | N1 | N2 | N3 | N4 | N5 | N6 | N7 | N8 | N9 | $G_1$ | $G_2$ | $G_3$ |
|---|---|---|---|---|---|---|---|---|---|---|---|---|
| N1 | | X | X | 1 | | | | | | | | 1 |
| N2 | | | | | X | X | | | | 1 | | |
| N3 | | | | | X | X | | | | 1 | | |
| N4 | 1 | | | | | | 1 | | | | | |
| N5 | | | | | | | | X | X | | | 1 |
| N6 | | | | | | | | X | X | | | 1 |
| N7 | | | | | | | | X | X | | | 1 |
| N8 | | | | | | | | | | | | |
| N9 | | | | | | | | 1 | | 1 | | |
| $G_1$ | | | | | 1 | 1 | | | | | | |
| $G_2$ | | 1 | 1 | | | | | | | | | |
| $G_3$ | | | | | | | | | | | | |

Table 5 shows the determination/identification of the groups per row. The determination/identification involves scanning the rows in the same manner as discussed previously. For example, scanning table 5 starting at the first row (row N1), N1 is shown to be able to communicate with N2, N3, and N4, and since $G_2$ includes N2 and N3, the cell (N1,$G_2$) is set to "1". Then, cell (N1, N2) and cell (N1, N3) are removed (e.g., the X cells in table 5) because those nodes belong to $G_2$. At the second row (row N2), N2 is shown to be able to communicate with N5 and N6, and since $G_1$ includes N5 and N6, the cell (N2, $G_1$) is set to "1", and then cell (N2, N5) and cell (N2, N6) are removed (e.g., the X cells in table 5) since those nodes belong to $G_1$. The identification of other groups per row is performed in the same manner, which in this example is up to row N9. Table 5 also shows the determination/identification of the groups per column, which involves scanning the columns in the same manner as discussed previously. For example, scanning table 5 in order from N1 to N9, N5 is shown to be the first column with more than one cell with a value of "1," which shows that N5 is capable of receiving communications from N2 and N3. Since $G_1$ includes N5 and N6, the cell ($G_1$, N2) is set to "1", and then cell (N2, N5) and cell (N3, N5) are removed (e.g., the X cells in table 5) since those nodes belong to $G_1$. The identification of other groups per column is performed in the same manner.

At operation 725, the firewall processor(s) 106 "groups the groups" by applying the source and destination groups obtained in operation 715 to the G rows and G columns. This is done in a same or similar manner as discussed previously with respect to operation 720. Then, the firewall processor 106 removes the matching cells and/or set the matching cells to zero (0). In this example, these cells are the cells with an "X" in table 6 and the newly set rows are boldened.

For example, scanning table 6 starting at the first G row (row $G_1$), $G_1$ is shown to be able to communicate with N8 and N9, and since G3 includes N8 and N9, the cell ($G_1$, G3) is set to "1" (e.g., bolded in table 6). Then, cell ($G_1$, N8) and cell ($G_1$, N9) are set to zero (e.g., the X cells in table 6) because those nodes belong to $G_3$. At the second G row (row $G_2$), $G_2$ is shown to be able to communicate with N5 and N6, and since $G_1$ includes N5 and N6, the cell ($G_2$, $G_1$) is set to "1" (e.g., bolded in table 6), and then cell ($G_2$, N5) and cell ($G_2$, N6) are set to zero (e.g., the X cells in table 6) since those nodes belong to $G_1$. The identification of other groups per row is performed in the same manner.

Similarly, the groups are applied to the G columns. For example, scanning table 6 in order from column $G_1$ to $G_3$, $G_1$ is shown to be capable of receiving communications from N2 and N3, and because $G_2$={N2, N3}, the cell ($G_2$, $G_1$) is set to "1" (e.g., bolded in table 6). Note that this cell was already set to "1" during the group row scan. Then, cell (N2, $G_1$) and cell (N3, $G_1$) are set to zero (e.g., the X cells in table 6) since those nodes belong to $G_2$. Next, $G_3$ is shown to be capable of receiving communications from N5, N6, and N7, and because $G_1$={N5, N6}, the cell ($G_1$, $G_3$) is set to "1" (e.g., bolded in table 6), and then cell (N5, $G_3$) and cell (N6, $G_3$) are set to zero (e.g., the X cells in table 6) since those nodes belong to $G_1$. The cell (N7, $G_3$) is remains set because N7 does not belong to a group.

TABLE 6

|    | N1 | N2 | N3 | N4 | N5 | N6 | N7 | N8 | N9 | $G_1$ | $G_2$ | $G_3$ |
|----|----|----|----|----|----|----|----|----|----|----|----|----|
| N1 |    |    | 1  |    |    |    |    |    |    | 1  |    |    |
| N2 |    |    |    |    |    |    |    |    |    |    | X  |    |
| N3 |    |    |    |    |    |    |    |    |    |    | X  |    |
| N4 | 1  |    |    |    | 1  |    |    |    |    |    |    |    |
| N5 |    |    |    |    |    |    |    |    |    |    |    | X  |
| N6 |    |    |    |    |    |    |    |    |    |    |    | X  |
| N7 |    |    |    |    |    |    |    |    |    |    |    | 1  |
| N8 |    |    |    |    |    |    |    |    |    |    |    |    |
| N9 |    |    |    |    |    |    |    |    |    |    |    |    |
| $G_1$ |    |    |    |    |    |    |    | X  | X  | 1  |    |    |
| $G_2$ |    | X  | X  |    |    |    |    |    |    |    | 1  |    |
| $G_3$ |    |    |    |    |    |    |    |    |    |    |    |    |

At operation 730, the firewall processor 106 generates a simplified SAT based on the groupings of groups, an example of which is shown by table 7. In table 7, the simplified SAT is a version of the SAT 402 with the grouped nodes N2, N3, N5, N6, N8, and N9 removed since those nodes are replaced by their respective groups $G_1$, $G_2$, $G_3$. Additionally, FIG. 8 shows the "optimal" service graph 800, which represents the simplified SAT of this example.

TABLE 7

|    | N1 | N4 | N7 | G1 | G2 | G3 |
|----|----|----|----|----|----|----|
| N1 |    | 1  |    |    | 1  |    |
| N4 | 1  |    | 1  |    |    |    |
| N7 |    |    |    |    |    | 1  |
| G1 |    |    |    |    |    | 1  |
| G2 |    |    | 1  |    |    |    |
| G3 |    |    |    |    |    |    |

In this example, the SAT 402 included 15 rules (R) and the simplified SAT includes 7 rules (R'). The reduction of rules in this manner provides a rules compression ratio (G2OA efficiency) of $$C = 1 - \frac{R'}{R} = 1 - \frac{7}{15} = 53.3\%.$$

Recursive G2OA:

In embodiments, the G2OA can be applied recursively using the approach shown by table 8.

TABLE 8 while ($C_i > 0$):
    $SAT_i = g2oa(SAT_{i-1})$;

TABLE 8-continued $$C_i = 1 - \frac{R_i}{R_{i-1}};$$
i = i + 1;
end

In the approach outlined by table 8, $R_i$ is the final number of rules of an iteration i (e.g., the number of arcs of an SAT), and $C_i$ is the rules compression of the iteration i which is defined as $$C_i = \frac{R_{i-1} - R_i}{R_{i-1}} = 1 - \frac{R_i}{R_{i-1}}.$$

To apply G2OA recursively, the groups size gs, the maximum group number K, and the estimated number of policies cp need to be identified or determined. In some embodiments, the maximum group number K may be determined by identifying the final groups vector, and assigning a length of the final groups vector to K. In some embodiments, the groups size gs may be determined by calculating the internal sum of the SAT and dividing that internal sum by the total number of rows. Embodiments for determining the estimated number of policies cp is discussed in more detail infra. Simulation results of the recursive G2OA as applied to the above described practical example provided a rules compression of 60% for K=4 and 33% for K=2, giving an overall compression ratio of approximately 75%.

Additionally, random graph simulations were run wherein random SATs were generated using the programming language Python and the scientific computation package NumPy. In the random SATs, 50% of the rows and the columns included one or more cells set with a value of "1", which were randomly distributed. In these simulations, both source and destination groups are "big" in terms of size. In a random slice, the average number of destinations is half of the row element, and the average number of sources was half of the column element. Additionally, because the groups are random, the function-correlation is low, and the chances of two groups being identical are $2^{-n}$. Considering the full SAT, and $\pi_g$ being the probability of re-using a group, then $\pi_g = (p)*(n)*(2^{-n})$. 1+2 imply that in the random tests the algorithm performs "well" when using a number of groups of the same order of the dimension of the SAT. Furthermore, the following automatic settings were also applied to the random graph tests: (A) the group size is set to the average row sum in order to reduce the execution time by 50%, and (B) K is set automatically. In case of a random matrix, the average row sum tends to be equal to the average column sum for high values of N (where row and columns have the same dimension). Results of the random graph simulations are shown by tables 9-15.

TABLE 9

| 100 × 100 multiple iterations with 5,009 initial rules |||||||
|---|---|---|---|---|---|---|
| Iteration | K (auto) | Nodes | SAT Rules | Final Groups | Compression | Time |
| 0 | 83 | 183 | 1,552 | 83 | 69% | 0 m 0.349 s |
| 1 | 117 | 300 | 200 | 117 | 87% | 0 m 0.356 s |
| 2 | 0 | 300 | 200 | 0 | 0% | 0 m 0.243 s |
| OVERALL | NA | NA | 200 | NA | 96% | 0.948 s |

TABLE 10

1,000 × 1,000 multiple iterations with 498,889 initial rules

| Iteration | K (auto) | Nodes | SAT Rules | Final Groups | Compression | Time |
|---|---|---|---|---|---|---|
| 1 | 1,017 | 2,017 | 115,533 | 1,017 | 77% | 0 m 11.581 s |
| 2 | 983 | 3,000 | 2,000 | 983 | 98% | 0 m 10.968 s |
| 3 | 0 | 3,000 | 2,000 | 0 | 0% | 0 m 0.327 s |
| OVERALL | NA | NA | 2,000 | NA | 99% | 22.876 s |

TABLE 11

2,000 × 2,000 multiple iterations with 1,999,622 u initial rules

| Iteration | K (auto) | Nodes | SAT Rules | Final Groups | Compression | Time |
|---|---|---|---|---|---|---|
| 1 | 2,054 | 4,054 | 458,273 | 2,054 | 77% | 0 m 48.719 s |
| 2 | 1,946 | 6,000 | 4,000 | 1,946 | 99% | 0 m 43.841 s |
| 3 | 0 | 6,000 | 4,000 | 0 | 0 | 0 m 0.593 s |
| OVERALL | NA | NA | | NA | 99% | |

TABLE 12

5,000 × 5,000 multiple iterations with 12,500,082 initial rules

| Iteration | K (auto) | Nodes | SAT Rules | Final Groups | Compression | Time |
|---|---|---|---|---|---|---|
| 1 | 4,893 | 9,893 | 3,193,820 | 4,893 | 74% | 6 m 6.245 s |
| 2 | 5,105 | 14,998 | 9,998 | 5,105 | 99% | 5 m 30.314 s |
| 3 | 0 | 14.998 | 9.998 | 5,105 | 0 | 0 m 2.592 s |
| OVERALL | NA | NA | | NA | 99.9% | |

TABLE 13

10,000 × 10,000 single iteration with 49,996,298 initial rules

| | | | Execution Time | |
|---|---|---|---|---|
| K | Compression | Rules | Grp size = 2 | Grp size = auto |
| 5,000 | 44% | 27,889,443 | 93 m 44.283 s | 26 m 7.906 |
| 10,000 | 75% | 12,371,194 | 102 m 47.520 s | 35 m 58.534 s |

TABLE 14

20,000 × 20,000 single iteration with 199,997,406 initial rules

| K | Compression | Rules | Grp size = auto |
|---|---|---|---|
| 10,000 | 44% | 111,830,641 | 130 m 15.921 a |
| 20,000 | 75% | 49,453,425 | 254 m 10.987 s |

TABLE 15

30,000 × 30,000 single iteration with 449,982,489 initial rules

| K | Compression | Rules | Grp size = auto |
|---|---|---|---|
| 30,000 | 75% | 112,074,218 | 770 m 14.927 s |

Furthermore, application of the G2OA to existing policies 35 was tested. Network ACLs differ from SATs in that ACL access rules are processed in order, whereas order does not matter in for SATs; and the access rules of an ACL may include allow rules and/or deny rules, whereas SATs only include allow rules. For purposes of these tests, the deny rules were removed in order to transform the ACLs into SATs, although other approaches to converting ACLs into SATs could be used.

Transforming ACLs into SATs involved (1) analyzing an ACL including the total number of rules, a total number of nodes, a total number of deny rules, and a total number of services; (2) identifying the deny rules, including applying the deny rules to all subsequent policies if possible, and if not possible, attempting to move the deny rules in such a way to optimize the "deny-free" chunk size; (3) for each ACL chunk inside which there are no deny rules, applying the optimization, rendering each chunk as an ACL, and merging the different chunks together, adding the deny rules between them. Additionally, some ACLs may include rules where "any source" or "any destination" is included in the rule. These rules were handled by creating an "ANY node" that can be used as source and as a destination. This technique allows reproduction of the "any" rule without too much effort, requiring the additional overhead of two rules per SAT. Alternative approaches could be used to handle the rules with "any source" and/or "any destination." For example, another approach to handling "any" rules may include broadcasting deny rules to all the nodes (e.g., by setting the SAT to 1), but this approach has two major drawbacks. First, this approach is computationally intensive, requiring access the cells on a one-by-one basis (e.g., the SAT are sparse matrices). Second, the advantage of reducing two unneeded rules per service is not enough to justify the computation overhead.

In these tests, the policies 35 are capirca ACLs ignoring the deny rules, and compression tests were performed on three ingress-egress pairs (ingress, egress) of policies set from 3 different locations named location 1 (loc1), location 2 (loc2), and location 3 (loc3) according to the following the steps: (1) conversion and analysis including transforming the policy/ACL into an SAT, applying the deny rules to the SAT when possible, and ignoring the deny rules that could not be applied to the SAT; and (2) applying the recursive G2OA to the SAT. Ignoring the deny rules in step (1) increases the chances of cross-correlation for both service and function, and therefore, the chances of improving the overall compression. It should be noted that a capirca policy/ACL corresponds to multiple entries in the SAT rules, and therefore, the number of capirca policies/ACLs is less than or equal the number of SAT rules.

The results of these tests are shown by tables 16-21. In the following tables, K, represents the maximum number of groups, and how much the SAT grows from one iteration to the other. At each iteration, the SAT was extended by $(p) \times (K_i) \times (K_i)$ elements). $N_i$ is the total number of nodes and groups in an iteration. For iteration n, 0, N is the original number of networks, in the iteration i. $N_i$ is the combined value of nodes and "supernodes" (or groups). Since $N_i$ the number of nodes in the iteration i, $N_{i+1}=N_i+K_i$. $S_i$ is the total number of different services in the original ruleset; this number does not change during the iterations of G2OA. $R_i$ this is the total number of rules (e.g., the number of cells having a value of "1" in the SAT), and represents how many rules exist in the ruleset. G2OA is used to reduce this number as much as possible. $G_i$ is the actual number of groups that have been identified by the G2OA. In iteration i, the number of groups $G_i \leq K_i$. The reason for this relationship is that G2OA reduces the number of groups to unique vectors, both as source and destination groups. $C_i$ is the SAT compression, which represents the efficacy of the application of G2OA in iteration i, and is defined as $$C_i = \frac{R_i - R_{i-1}}{R_i} = 1 - \frac{R_{i-1}}{R_i}$$

where $R_i$ the number of rules in the iteration i. The estimated capirca rules is a number calculated assuming that the SAT rules will be rendered by grouping them per source, destination, and protocol. In this case, a rendered capirca policy will contain all the SAT flows across different services having the same source and the same destination. Other approaches are possible (e.g., grouping per destination, grouping per protocol, etc.).

TABLE 16

Results of test-1 (loc1-dcr-to-loc1) with 357 capirca policies

| Iteration | $K_I$ | $N_i$ | $S_i$ | $R_i$ | $G_i$ | $C_i$ | time |
|---|---|---|---|---|---|---|---|
| 0 | N/A | 2,149 | 125 | 12,515 | N/A | N/A | N/A |
| 1 | 129 | 2,278 | 125 | 1,665 | 95 | 87% | 1 m 21.237 s |
| 2 | 37 | 2,315 | 125 | 373 | 32 | 78% | 0 m 31.416 s |
| 3 | 5 | 2,320 | 125 | 344 | 5 | 8% | 0 m 10.917 s |
| 4 | 0 | 2,320 | 125 | 344 | 0 | 0 | 0 m 9.916 s |

Final number of SAT rules: 344
SAT Compression = 1 − 344/12515 ≅ 97%
Sorting per (s, d, p), Estimated capirca rules: 187
Estimated capirca compression: 1 − 187/357 ≅ 48%

TABLE 17

Results of test-2 (loc1-dcr-from-loc1) with 312 capirca policies

| Iteration | $K_I$ | $N_i$ | $S_i$ | $R_i$ | $G_i$ | $C_i$ | time |
|---|---|---|---|---|---|---|---|
| 0 | N/A | 2,079 | 141 | 10,239 | N/A | N/A | N/A |
| 1 | 137 | 2,216 | 141 | 1,895 | 97 | 81% | 1 m 33.028 s |
| 2 | 42 | 2,258 | 141 | 330 | 37 | 83% | 0 m 39.832 s |
| 3 | 2 | 2,260 | 141 | 327 | 2 | 1% | 0 m 8.995 s |
| 4 | 0 | 2,260 | 141 | 327 | 0 | 0% | 0 m 10.385 s |

Final number of SAT rules: 327
SAT Compression = 97%
Sorting per (s, d, p), Estimated capirca rules: 192
Estimated capirca compression: 1 − 192/312 ≅ 38%

TABLE 18

Results of test-3 (loc2-dcr-to-loc2) with 583 capirca policies

| Iteration | $K_I$ | $N_i$ | $S_i$ | $R_i$ | $G_i$ | $C_i$ | time |
|---|---|---|---|---|---|---|---|
| 0 | N/A | 3,291 | 121 | 20,201 | N/A | N/A | N/A |
| 1 | 186 | 3,477 | 121 | 1,402 | 151 | 93% | 3 m 16.800 s |
| 2 | 47 | 3,524 | 121 | 469 | 41 | 67% | 1 m 3.669 s |
| 3 | 5 | 3,529 | 121 | 439 | 4 | 6% | 0 m 19.649 |
| 4 | 1 | 3,530 | 121 | 433 | 1 | 1% | 0 m16.173 s |
| 5 | 0 | 3,530 | 121 | 433 | 1 | 0 | 0 m 21.586 s |

Final number of SAT rules: 433
SAT Compression = 1 − 422/19.578 ≅ 99%
Sorting per (s, d, p), Estimated capirca rules: 268
Estimated capirca compression: 1 − 270/583 ≅ 54%

TABLE 19

Results of test-4 (loc2-dcr-from-loc2) with 491 capirca policies

| Iteration | $K_I$ | $N_i$ | $S_i$ | $R_i$ | $G_i$ | $C_i$ | time |
|---|---|---|---|---|---|---|---|
| 0 | N/A | 2,818 | 137 | 23,609 | N/A | N/A | N/A |
| 1 | 211 | 3,029 | 137 | 2,706 | 159 | 89% | 3 m 23.414 s |
| 2 | 58 | 3,087 | 137 | 455 | 53 | % | 1 m 14.650 s |
| 3 | 8 | 3,095 | 137 | 446 | 6 | 2% | 0 m 20.379 s |
| 4 | 2 | 3,097 | 137 | 443 | 1 | 1% | 0 m 15.321 s |
| 5 | 0 | 3,097 | 137 | 443 | 0 | 0% | 0 m 20.231 s |

Final number of SAT rules: 443
SAT Compression = 99%
Sorting per (s, d, p), Generated capirca rules: 257
Estimated capirca compression: 1 − 257/491 ≅ 48%

TABLE 20

Results of test-5 (loc3-dcr-to-loc3) with 491 capirca policies

| Iteration | $K_I$ | $N_i$ | $S_i$ | $R_i$ | $G_i$ | $C_i$ | time |
|---|---|---|---|---|---|---|---|
| 0 | N/A | 3,223 | 122 | 18,786 | N/A | N/A | N/A |
| 1 | 172 | 3,395 | 122 | 2,654 | 132 | 86% | 2 m 50.930 s |
| 2 | 47 | 3,442 | 122 | 448 | 42 | 83% | 1 m 5.878 s |
| 3 | 6 | 3,448 | 122 | 416 | 6 | 7% | 0 m 21.590 s |
| 4 | 1 | 3,449 | 122 | 415 | 1 | 1% | 0 m 15.468 s |
| 5 | 0 | 3,450 | 122 | 415 | 0 | 0% | 0 m 21.375 s |

SAT rules: 415
SAT Compression = 98%
Sorting per (s, d, p), Estimated capirca rules: 258
Estimated capirca Compression: 1 − 268/491 ≅ 47%

TABLE 21

Results of test-6 (loc3-dcr-from-oc3) with 419 capirca policies

| Iteration | $K_I$ | $N_i$ | $S_i$ | $R_i$ | $G_i$ | $C_i$ | time |
|---|---|---|---|---|---|---|---|
| 0 | N/A | 2,541 | 137 | 20,836 | N/A | N/A | N/A |
| 1 | 189 | 2,730 | 137 | 1,122 | 146 | 95% | 2 m 43.419 s |
| 2 | 52 | 2,782 | 137 | 426 | 46 | 62% | 1 m 0.211 s |
| 3 | 6 | 2,788 | 137 | 419 | 5 | 2% | 0 m 16.070 s |
| 4 | 1 | 2,789 | 137 | 417 | 1 | 1% | 0 m 11.745 s |
| 5 | 0 | 2,789 | 137 | 417 | 0 | 0 | 0 m 15.469 |

SAT rules: 417
SAT Compression = 98%
Sorting per (s, d, p), Estimated CAPIRCA rules: 268
Estimated CAPIRCA Compression: 1 − 268/419 ≅ 36%

Figure 9:
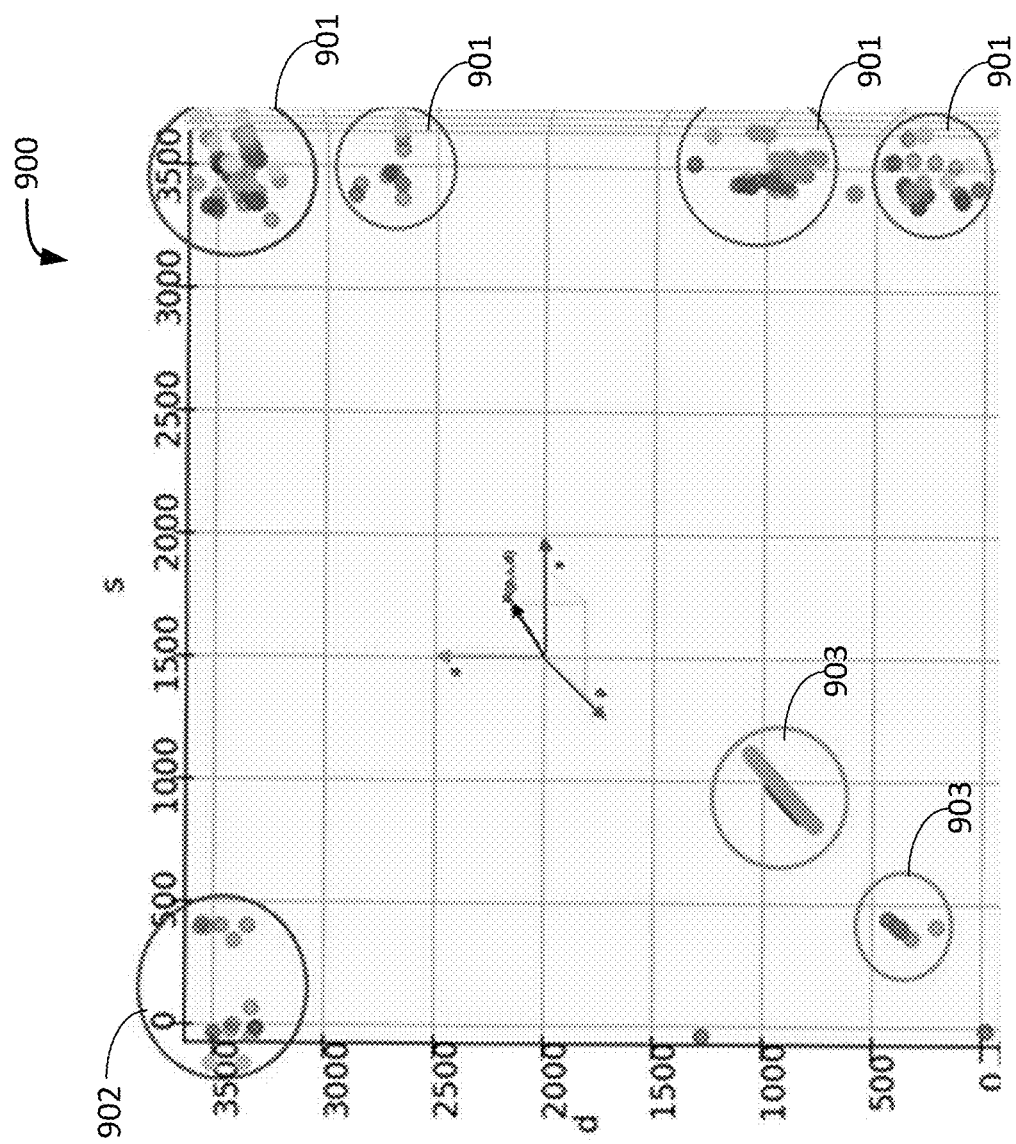
FIG. 9 shows a graphical representation of policy rendering of a ruleset according to various embodiments.

FIG. 9 shows a graph 900 representing the behavior of recursive G2OA, and in particular, graph 900 is a graphical representation of capirca policy rendering for the ruleset for test-3 (object3-to-object4). The capirca policy set is a view of the SAT where the rules are sorted by source, destination and protocol. The capirca policy aggregates all flows (e.g., services) with the same (source, destination) pair. From a graphical standpoint, graph 900 represents the capirca policy set as a projection (frontal slice) of the SAT. The graph 900 shows that the rendering has been applied with a source-based grouping. Graph 900 includes four different clusters (e.g., circles 901 in FIG. 9) showing destination clusters with s around 3500; two source clusters (e.g., within circle 902 in FIG. 9) with destination d around 3500, and two minor clusters (e.g., circles 903 in FIG. 9) that seem to move around the diagonal. This and other observations may help to cross-correlate datasets (e.g., for policy validation purposes) and policy sets amongst different contexts (e.g., different nodes/objects).

Figure 10:
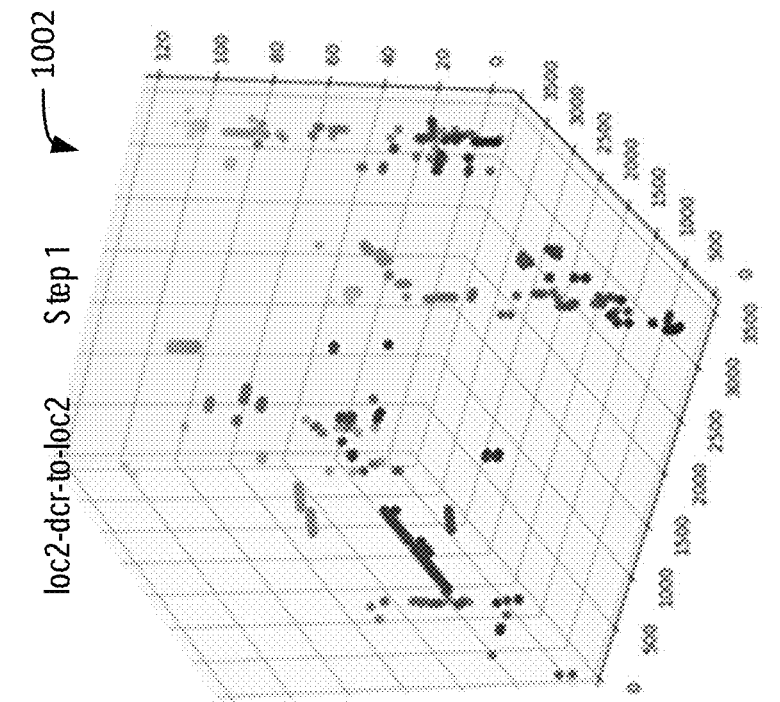
FIGS. 10 and 11 show graphical representations of an example recursive application of G2OA.
Figure 10:
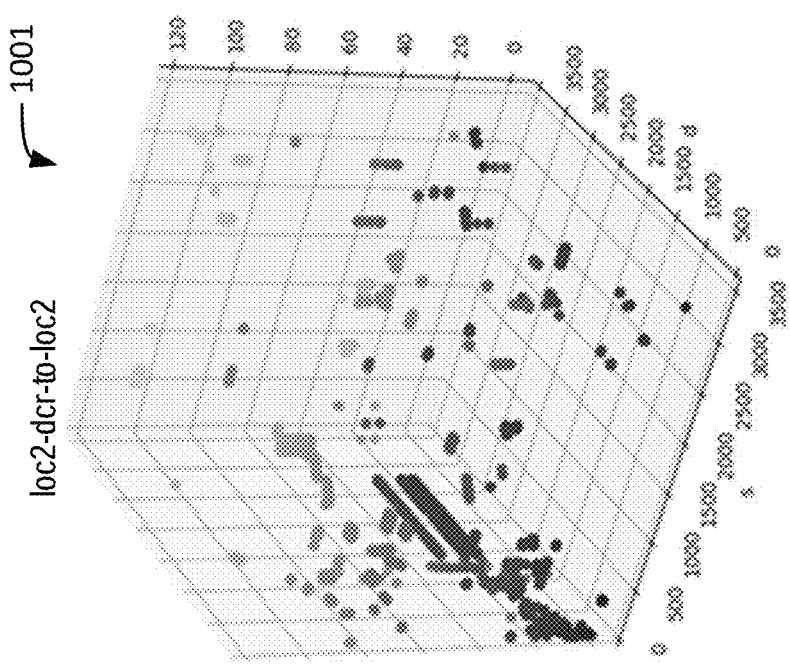
Figure 11:
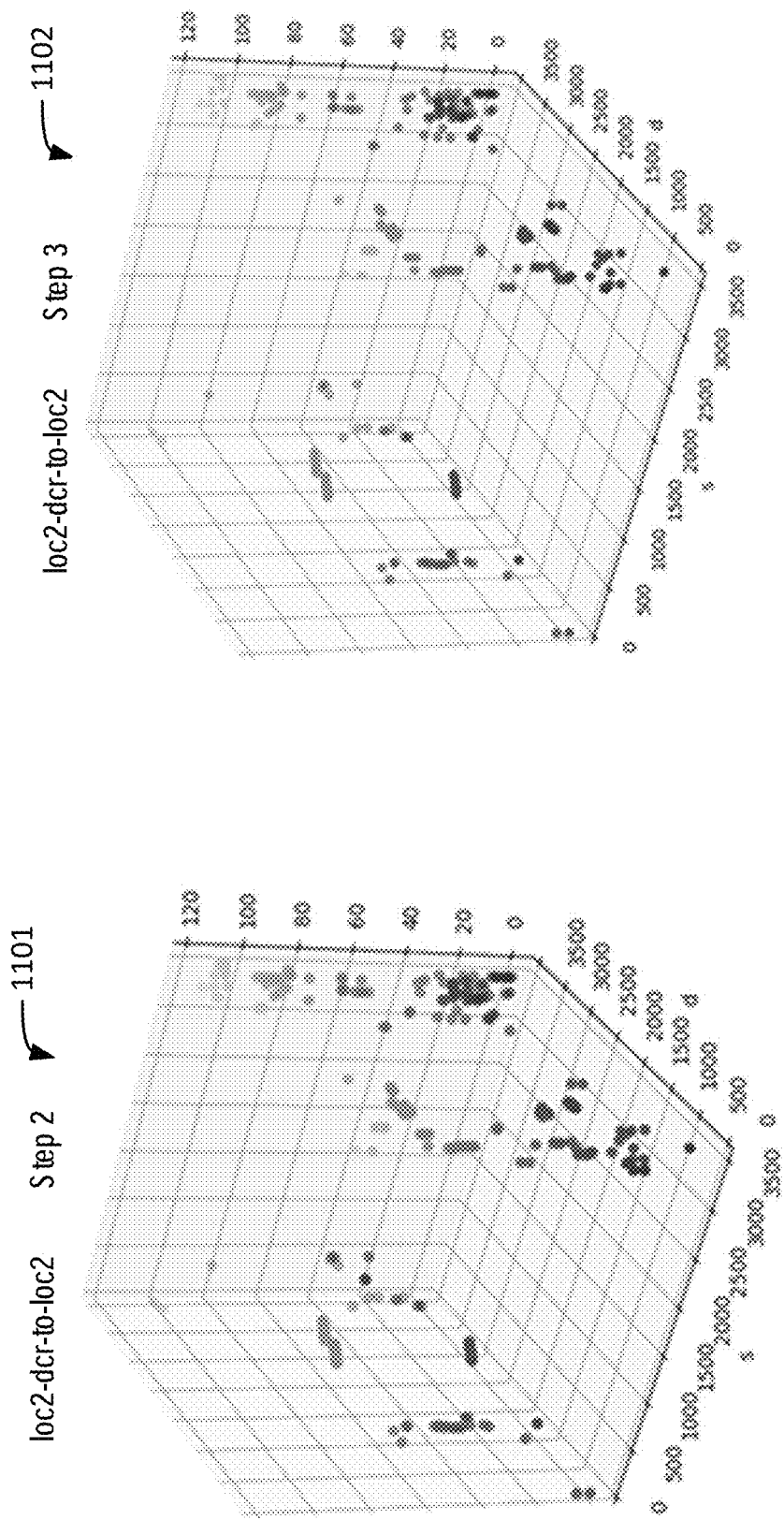

FIGS. 10 and 11 show graphical representations of the recursive application of G2OA for the evolution of the ruleset for loc2-dcr-to-loc2 (see e.g., table 18). Each graph 1001, 1002, 1101, and 1102 shows a distribution of different policies 35, where each rule vector of each policy 35 is represented as a point in a 3D (source, destination, protocol) space. In some embodiments, the rules of each policy 35 (e.g., each point in the graphs) may be color coded to differentiate between different policies 35. Referring to FIG. 10, graph 1001 shows the initial distribution of the policies 35. Graph 1002 shows the resulting optimal SAT after a first application of G2OA ("Step1" in FIG. 10). Referring now to FIG. 11, graph 1101 shows the resulting optimal SAT after a second application of G2OA ("Step2" in FIG. 10), and graph 1102 shows the resulting optimal SAT after a third application of G2OA ("Step3"). The number of points decrease in the graphs 1001, 1002, 1101, and 1102, showing how G2OA group the points and reduce the overall rules number.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C #, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions of a Generalized Group Optimization Algorithm (G2OA), wherein execution of the instructions by one or more processors of a computing system is to cause a computing system to:
generate a service adjacency tensor (SAT) in three dimensional (3D) space, the SAT comprising a plurality of vectors, each vector of the plurality of vectors represents respective rules for individual objects of a set of objects to communicate in a network using one or more services;
generate one or more source groups and one or more destination groups;
generate candidate groups from the one or more source groups and the one or more destination groups;
apply the candidate groups to the SAT; and
generate a new SAT based on application of the candidate groups to the SAT, the new SAT comprising one or more new vectors, each vector of the one or more new vectors represents a new rule for candidate groups communicating in the network using the one or more services.

2. The one or more NTCRM of claim 1, wherein each of the respective rules comprises a source object that is allowed to communicate with a destination object using a service.

3. The one or more NTCRM of claim 1, wherein execution of the instructions is to cause a processing device to:
generate a network service graph comprising a plurality of objects and edges representing communications between the plurality of objects using a service.

4. The one or more NTCRM of claim 1, wherein each vector of the plurality of vectors represents a rule of a plurality of rules, and the plurality of rules belong to corresponding network policies for communicating in a computer network.

5. The one or more NTCRM of claim 1, wherein the SAT comprises a plurality of entries, each entry comprising a source object from the set of objects and a destination object from the set of objects, and to generate the SAT, execution of the instructions is to cause the computing system to:
generate the SAT such that individual entries the plurality of entries include a value of one if and only if a source object for the individual entries can communicate with a destination object for the individual entries using a given service.

6. The one or more NTCRM of claim 5, wherein, to generate the new SAT, execution of the instructions is to cause the computing system to:
for each source object belonging and each destination object belonging to a candidate group having a value of one in a respective entry,
remove the value of the respective entry for the source object, and
add a value of one to an entry associated with the candidate group.

7. The one or more NTCRM of claim 1, wherein, to generate the one or more source groups and the one or more destination groups, execution of the instructions is to cause the computing system to:
generate the one or more source groups such that each source group of the one or more source groups includes objects from the set of objects that can send communications to an individual object of the set of objects;
generate the one or more destination groups such that each destination group of the one or more destination groups includes objects from the set of objects that are allowed to receive communications from the individual object.

8. The one or more NTCRM of claim 1, wherein, to generate candidate groups, execution of the instructions is to cause the computing system to:
insert the one or more source groups and the one or more destination groups into a candidate group vector; and
score each member of the candidate group vector for each of the one or more services.

9. The one or more NTCRM of claim 7, wherein, to score each member of the candidate group vector, execution of the instructions is to cause the computing system to:
determine a number of times each member of the candidate group vector appears the one or more services; and
multiply the determined number by a cardinality of a corresponding member of the candidate group vector minus one.

10. The one or more NTCRM of claim 1, wherein the computer system comprises the one or more processors and the one or more NTCRM, and the computer system is one of a switch, a router, a gateway appliance, a firewall computer appliance, or a server computer system.

11. A computer-implemented Generalized Group Optimization method, the method comprising:
generating, by a computing system, a service adjacency tensor (SAT) comprising a plurality of vectors, each vector of the plurality of vectors representing a corresponding rule of a plurality of rules for a network of objects, individual objects in the network being capable of communicating with one or more other objects in the network using one or more services;
grouping, by the computing system, individual objects into one or more source groups and into one or more destination groups for each service of the one or more services, each source group of the one or more source groups including objects from the network that can send communications to a given object and each destination group of the one or more destination groups including objects from the network that can receive communications from the individual object;
selecting, by the computing system, one or more candidate groups from the one or more source groups and the one or more destination groups;
identifying, by the computing system, individual objects in the network that can communicate with each candidate group of the one or more candidate groups based on the objects belonging to each candidate group;
identifying, by the computing system, individual candidate groups of the one or more candidate groups that can communicate with other ones of the one or more candidate groups based on the objects belonging to each candidate group; and
generating a simplified SAT comprising the identified individual objects and the identified candidate groups.

12. The method of claim 11, wherein generating the SAT comprises:
generating the SAT to include a plurality of entries, each entry of the plurality of entries corresponding to a source object in the network, a destination object in the network, and a service of the one or more services;
setting a value of an individual entry of the plurality of entries to include a value of "1" when a source object of the individual entry can communicate with a destination object of the individual entry using a service of the individual entry; and setting the value of the individual entry to include a value of "0" when the source object of the individual entry cannot communicate with the destination object of the individual entry using the service of the individual entry.

13. The method of claim 11, wherein grouping the individual objects into one or more source groups and into one or more destination groups comprises:
for each object in the network,
placing each object that is capable of sending communications to a given object into a source group of the given object, and
placing each object that is capable of receiving communications from the given object into a destination group of the given object.

14. The method of claim 11, wherein selecting the one or more candidate groups comprises:
calculating a score for each source group and each destination group based on a number of objects in each source group and each destination group and a number of times each source group and each destination group is identified as a group.

15. The method of claim 11, wherein selecting the one or more candidate groups comprises:
calculating a score for each source group and each destination group based on a number of objects in each source group and each destination group and a number of times each source group and each destination group is identified as a group.

16. The method of claim 15, wherein generating the simplified SAT comprises:
replacing individual objects the one or more candidate groups to which the individual objects belong.

17. A computing system to enforce one or more network policies, the computing system comprising:
at least one processing device;
at least one memory device coupled with the at least one processing device, the at least one memory device operable to store one or more policies, each policy of the one or more policies including a plurality of rules, each rule of the plurality of rules indicating a source object that is allowed to communicate with a destination object using a service of a plurality of services; and
a network interface coupled with the at least one processing device, the at least one processing device is operable to:
identify the plurality of rules from the one or more policies,
generate a service adjacency tensor (SAT) in three dimensional (3D) space, the SAT comprising a plurality of vectors, each vector of the plurality of vectors represents respective rules of the plurality of rules,
generate one or more source groups and one or more destination groups,
generate candidate groups from the one or more source groups and the one or more destination groups,
apply the candidate groups to the SAT,
generate a new SAT based on application of the candidate groups to the SAT, the new SAT comprising one or more new vectors, each vector of the one or more new vectors represents a new rule for candidate groups communicating in the network using the one or more services, and
generate and store one or more new policies including one or more new rules based on each vector of the one or more new vectors.

18. The computing system of claim 17, wherein the at least one processing device is operable to control enforcement of the one or more new policies.

19. The computing system of claim 18, wherein the at least one processing device is operable to:
inspect one or more data packets received by the network interface; and
permit forwarding of the one or more data packets if a source object indicated by the one or more data packets belongs to a candidate group that is permitted to:
communicate with a destination object indicated by the one or more data packets, or
communicate with a candidate group to which the destination object indicated by the one or more data packets belongs.

20. The computing system of claim 17, wherein the computing system is a switch, a router, a gateway appliance, a firewall computer appliance, or a server computer system.

* * * * *